(12) United States Patent
Li et al.

(10) Patent No.: US 10,542,274 B2
(45) Date of Patent: Jan. 21, 2020

(54) DICTIONARY ENCODING AND DECODING OF SCREEN CONTENT

(71) Applicant: Microsoft Technology Licensing, LLC, Redmond, WA (US)

(72) Inventors: Bin Li, Beijing (CN); Jizheng Xu, Beijing (CN); Feng Wu, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 15 days.

(21) Appl. No.: 15/120,389

(22) PCT Filed: Mar. 4, 2014

(86) PCT No.: PCT/CN2014/072774
§ 371 (c)(1),
(2) Date: Aug. 19, 2016

(87) PCT Pub. No.: WO2015/131304
PCT Pub. Date: Sep. 11, 2015

(65) Prior Publication Data
US 2017/0064330 A1  Mar. 2, 2017

(51) Int. Cl.
*H04N 19/593* (2014.01)
*H04N 19/70* (2014.01)
(Continued)

(52) U.S. Cl.
CPC .......... *H04N 19/50* (2014.11); *H04N 19/176* (2014.11); *H04N 19/46* (2014.11); *H04N 19/90* (2014.11)

(58) Field of Classification Search
CPC ...... H04N 19/50; H04N 19/176; H04N 19/46; H04N 19/90
See application file for complete search history.

(56) References Cited

U.S. PATENT DOCUMENTS

| | | |
|---|---|---|
| 5,049,986 A | 9/1991 | Aono et al. |
| 5,488,570 A | 1/1996 | Agarwal |

(Continued)

FOREIGN PATENT DOCUMENTS

| | | |
|---|---|---|
| CN | 1874519 A | 12/2006 |
| CN | 101009835 A | 8/2007 |

(Continued)

OTHER PUBLICATIONS

Mingyuan (Column-Based RLE in Row-Oriented Database, 978-1-4244-5219—Published Apr. 2009, 2009 IEEE).*

(Continued)

*Primary Examiner* — Christopher S Kelley
*Assistant Examiner* — Nasim N Nirjhar
(74) *Attorney, Agent, or Firm* — Klarquist Sparkman, LLP

(57) ABSTRACT

Innovations are provided for encoding and/or decoding video and/or image content using dictionary modes. For example, some innovations predict current pixel values from previous pixel values stored in a 1-D dictionary. Other innovations predict current pixel values from previous pixel values using a pseudo 2-D dictionary mode. Yet other innovations predict current pixel values from previous pixel values in a reference picture using an inter pseudo 2-D dictionary mode. Pixel values can be predicted from previous pixel values (e.g., stored in a dictionary) that are identified by an offset and a length. Yet other innovations encode pixel values using hash matching of pixel values.

13 Claims, 10 Drawing Sheets

(51) Int. Cl.
  *H04N 19/50* (2014.01)
  *H04N 19/176* (2014.01)
  *H04N 19/46* (2014.01)
  *H04N 19/90* (2014.01)

(56) References Cited

U.S. PATENT DOCUMENTS

| | | |
|---|---|---|
| 5,706,290 A | 1/1998 | Shaw et al. |
| 6,292,194 B1 | 9/2001 | Powell, III |
| 6,400,893 B1 | 6/2002 | Murase et al. |
| 6,701,012 B1 | 3/2004 | Matthews |
| 6,748,116 B1 | 6/2004 | Yue |
| 7,016,547 B1 | 3/2006 | Smirnov |
| 7,023,924 B1 | 4/2006 | Keller et al. |
| 7,072,512 B2 | 7/2006 | Mehrotra |
| 7,085,420 B2 | 8/2006 | Mehrotra |
| 7,218,790 B2 | 5/2007 | Smirnov |
| 7,289,674 B2 | 10/2007 | Karczewicz |
| 7,317,839 B2 | 1/2008 | Holcomb |
| 7,340,103 B2 | 3/2008 | Smirnov |
| 7,352,905 B2 | 4/2008 | Mukerjee et al. |
| 7,403,136 B2 | 7/2008 | De La Cruz et al. |
| 7,496,143 B2 | 2/2009 | Schwarz et al. |
| 7,848,426 B2 | 12/2010 | Lee et al. |
| 7,903,873 B2 | 3/2011 | Lu et al. |
| 7,965,861 B2 | 6/2011 | Agaian et al. |
| 7,978,770 B2 | 7/2011 | Luo et al. |
| 8,036,271 B2 | 10/2011 | Winter et al. |
| 8,085,845 B2 | 12/2011 | Tourapis et al. |
| 8,116,374 B2 | 2/2012 | Gordon et al. |
| 8,170,101 B2 | 5/2012 | Lei |
| 8,213,503 B2 | 7/2012 | Tu et al. |
| 8,218,641 B2 | 7/2012 | Wang |
| 8,300,963 B2 | 10/2012 | Ohk et al. |
| 8,369,568 B2 | 2/2013 | Agaian et al. |
| 8,457,200 B2 | 6/2013 | Andersson et al. |
| 8,472,792 B2 | 6/2013 | Butt et al. |
| 8,493,513 B2 | 7/2013 | Sullivan |
| 8,509,553 B2 | 8/2013 | Ding |
| 8,548,057 B2 | 10/2013 | Li et al. |
| 8,619,857 B2 | 12/2013 | Zhao et al. |
| 8,644,375 B2 | 2/2014 | Segall et al. |
| 8,693,547 B2 | 4/2014 | Bankoski et al. |
| 8,711,945 B2 | 4/2014 | Henocq et al. |
| 8,731,369 B2 | 5/2014 | Li et al. |
| 8,737,824 B1 | 5/2014 | Bultje |
| 8,861,848 B2 | 10/2014 | Sato |
| 9,252,806 B2 | 2/2016 | Marpe et al. |
| 9,264,713 B2 | 2/2016 | Joshi et al. |
| 9,288,501 B2 | 3/2016 | Zheng et al. |
| 9,516,342 B2 | 12/2016 | Gisquet et al. |
| 9,591,325 B2 | 3/2017 | Li et al. |
| 9,609,336 B2 | 3/2017 | Topiwala et al. |
| 9,654,806 B2 | 5/2017 | Zou et al. |
| 9,699,468 B2 | 7/2017 | Guo et al. |
| 9,704,270 B1 | 7/2017 | Main et al. |
| 9,788,004 B2 | 10/2017 | Sun et al. |
| 9,924,175 B2 | 3/2018 | Pu et al. |
| 10,021,403 B2 | 7/2018 | Kolesnikov et al. |
| 10,038,915 B2 | 7/2018 | Joshi et al. |
| 10,062,181 B1 | 8/2018 | Longhurst et al. |
| 10,129,540 B2 | 11/2018 | Budagavi |
| 10,136,141 B2 | 11/2018 | Pu et al. |
| 10,230,983 B2 | 3/2019 | Liu et al. |
| 10,237,575 B2 | 3/2019 | Tsai et al. |
| 10,264,285 B2 | 4/2019 | Joshi et al. |
| 2001/0036314 A1 | 11/2001 | Yamaguchi et al. |
| 2001/0053248 A1 | 12/2001 | Maeda |
| 2002/0168105 A1 | 11/2002 | Li |
| 2003/0048944 A1 | 3/2003 | De Bonet |
| 2003/0202588 A1 | 10/2003 | Yu et al. |
| 2004/0022444 A1 | 2/2004 | Rhoads |
| 2004/0062312 A1 | 4/2004 | Heuer et al. |
| 2004/0202374 A1* | 10/2004 | Venkataraman ........ H04N 19/13 382/239 |
| 2005/0185713 A1 | 8/2005 | Winger et al. |
| 2005/0249283 A1 | 11/2005 | Kajiwara et al. |
| 2006/0104527 A1 | 5/2006 | Koto et al. |
| 2006/0274956 A1 | 12/2006 | Sohn et al. |
| 2006/0282855 A1 | 12/2006 | Margulis |
| 2007/0036226 A1 | 2/2007 | Kim et al. |
| 2007/0116110 A1 | 5/2007 | Diamant et al. |
| 2007/0116370 A1* | 5/2007 | Smirnov ................. H03M 7/40 382/245 |
| 2007/0201751 A1 | 8/2007 | Wu et al. |
| 2008/0021879 A1 | 1/2008 | Cheng |
| 2008/0037624 A1 | 2/2008 | Walker et al. |
| 2008/0063080 A1 | 3/2008 | Madumbu et al. |
| 2008/0084924 A1 | 4/2008 | Monro et al. |
| 2008/0317132 A1 | 12/2008 | Zhou et al. |
| 2009/0074307 A1 | 3/2009 | Lu et al. |
| 2009/0195690 A1 | 8/2009 | Wang |
| 2010/0061461 A1 | 3/2010 | Bankoski et al. |
| 2010/0111410 A1 | 5/2010 | Lu et al. |
| 2010/0158400 A1 | 6/2010 | Lu et al. |
| 2011/0142132 A1 | 6/2011 | Tourapis et al. |
| 2011/0194613 A1 | 8/2011 | Chen et al. |
| 2011/0255591 A1 | 10/2011 | Kim et al. |
| 2012/0163451 A1 | 6/2012 | Cohen et al. |
| 2012/0163457 A1 | 6/2012 | Wahadaniah et al. |
| 2012/0177118 A1 | 7/2012 | Karozewicz et al. |
| 2012/0189055 A1 | 7/2012 | Chien et al. |
| 2012/0195368 A1 | 8/2012 | Chien et al. |
| 2012/0236942 A1 | 9/2012 | Lin et al. |
| 2012/0250764 A1 | 10/2012 | Martin et al. |
| 2012/0281760 A1 | 11/2012 | Kim |
| 2012/0294353 A1 | 11/2012 | Fu et al. |
| 2012/0300840 A1 | 11/2012 | Ueda |
| 2012/0320975 A1 | 12/2012 | Kim et al. |
| 2012/0328209 A1 | 12/2012 | Sasai et al. |
| 2013/0003827 A1 | 1/2013 | Misra et al. |
| 2013/0034163 A1 | 2/2013 | Amonou et al. |
| 2013/0050254 A1 | 2/2013 | Tran et al. |
| 2013/0051452 A1 | 2/2013 | Li et al. |
| 2013/0114675 A1 | 5/2013 | Guo et al. |
| 2013/0114677 A1 | 5/2013 | Baylon et al. |
| 2013/0114713 A1 | 5/2013 | Bossen et al. |
| 2013/0114730 A1 | 5/2013 | Joshi et al. |
| 2013/0121417 A1 | 5/2013 | Chong et al. |
| 2013/0128974 A1 | 5/2013 | Chien et al. |
| 2013/0128982 A1 | 5/2013 | Kim et al. |
| 2013/0163664 A1 | 6/2013 | Guo et al. |
| 2013/0163668 A1 | 6/2013 | Chen et al. |
| 2013/0170550 A1 | 7/2013 | Li et al. |
| 2013/0182755 A1 | 7/2013 | Chen et al. |
| 2013/0188695 A1 | 7/2013 | Maani et al. |
| 2013/0188719 A1 | 7/2013 | Chen et al. |
| 2013/0202051 A1 | 8/2013 | Zhou |
| 2013/0215970 A1 | 8/2013 | Fang et al. |
| 2013/0243093 A1 | 9/2013 | Chen et al. |
| 2013/0258052 A1 | 10/2013 | Li et al. |
| 2013/0259128 A1 | 10/2013 | Song et al. |
| 2013/0272370 A1 | 10/2013 | Coban et al. |
| 2013/0272409 A1 | 10/2013 | Seregin et al. |
| 2013/0279577 A1 | 10/2013 | Schwarz et al. |
| 2013/0287103 A1 | 10/2013 | Seregin et al. |
| 2014/0002599 A1 | 1/2014 | Lee et al. |
| 2014/0003493 A1 | 1/2014 | Chen et al. |
| 2014/0003531 A1 | 1/2014 | Coban et al. |
| 2014/0016698 A1 | 1/2014 | Joshi et al. |
| 2014/0029668 A1 | 1/2014 | Lim et al. |
| 2014/0064360 A1 | 3/2014 | Rapaka et al. |
| 2014/0071235 A1 | 3/2014 | Zhang et al. |
| 2014/0086502 A1 | 3/2014 | Guo et al. |
| 2014/0140404 A1 | 5/2014 | Liu et al. |
| 2014/0184740 A1 | 7/2014 | Zhang et al. |
| 2014/0192883 A1 | 7/2014 | Seregin |
| 2014/0253681 A1 | 9/2014 | Zhang et al. |
| 2014/0294061 A1 | 10/2014 | Zhang et al. |
| 2014/0301465 A1 | 10/2014 | Kwon et al. |
| 2014/0301475 A1 | 10/2014 | Guo et al. |
| 2014/0355667 A1 | 12/2014 | Lei et al. |
| 2014/0376634 A1 | 12/2014 | Guo et al. |
| 2015/0016501 A1 | 1/2015 | Guo et al. |

(56) References Cited

U.S. PATENT DOCUMENTS

| | | | |
|---|---|---|---|
| 2015/0016533 A1 | 1/2015 | Pang et al. | |
| 2015/0030066 A1 | 1/2015 | Xu et al. | |
| 2015/0071357 A1 | 3/2015 | Pang et al. | |
| 2015/0110181 A1 | 4/2015 | Saxena et al. | |
| 2015/0146976 A1* | 5/2015 | Ma | H04N 1/646 382/166 |
| 2015/0186100 A1 | 7/2015 | Tsai et al. | |
| 2015/0189319 A1 | 7/2015 | Pu et al. | |
| 2015/0195526 A1 | 7/2015 | Zhu et al. | |
| 2015/0195559 A1 | 7/2015 | Chen et al. | |
| 2015/0208084 A1 | 7/2015 | Zhu et al. | |
| 2015/0229933 A1 | 8/2015 | Guo et al. | |
| 2015/0262404 A1 | 9/2015 | Laude et al. | |
| 2015/0264348 A1 | 9/2015 | Zou et al. | |
| 2015/0270850 A1 | 9/2015 | Marpe et al. | |
| 2015/0271517 A1 | 9/2015 | Pang et al. | |
| 2015/0312573 A1 | 10/2015 | Bugdayci et al. | |
| 2015/0326864 A1 | 11/2015 | Lainema | |
| 2015/0341635 A1 | 11/2015 | Seregin et al. | |
| 2015/0341655 A1 | 11/2015 | Joshi et al. | |
| 2015/0341656 A1 | 11/2015 | Seregin et al. | |
| 2015/0341674 A1 | 11/2015 | Seregin et al. | |
| 2015/0381994 A1 | 12/2015 | Yu et al. | |
| 2016/0057420 A1 | 2/2016 | Pang et al. | |
| 2016/0057430 A1 | 2/2016 | Kolesnikov et al. | |
| 2016/0112713 A1 | 4/2016 | Russell | |
| 2016/0219298 A1 | 7/2016 | Li et al. | |
| 2016/0227244 A1 | 8/2016 | Rosewarne | |
| 2016/0241858 A1 | 8/2016 | Li et al. | |
| 2016/0241868 A1 | 8/2016 | Li et al. | |
| 2016/0277733 A1 | 9/2016 | Li et al. | |
| 2016/0277760 A1 | 9/2016 | Li et al. | |
| 2016/0309172 A1 | 10/2016 | Laroche et al. | |
| 2016/0309177 A1 | 10/2016 | Laroche et al. | |
| 2016/0316214 A1 | 10/2016 | Gisquet et al. | |
| 2016/0330471 A1 | 11/2016 | Zhu et al. | |
| 2016/0373788 A1 | 12/2016 | Gamei et al. | |
| 2017/0064330 A1 | 3/2017 | Li et al. | |
| 2017/0070748 A1 | 3/2017 | Li et al. | |
| 2017/0127058 A1 | 5/2017 | Misra et al. | |
| 2017/0127090 A1 | 5/2017 | Rosewarne et al. | |
| 2017/0142418 A1 | 5/2017 | Li et al. | |
| 2017/0155899 A1 | 6/2017 | Lin | |
| 2017/0180737 A1 | 6/2017 | Ye et al. | |
| 2017/0238001 A1 | 8/2017 | Li et al. | |
| 2017/0302939 A1 | 10/2017 | Guo et al. | |
| 2018/0146197 A1 | 5/2018 | Yi et al. | |
| 2018/0288415 A1 | 10/2018 | Li et al. | |

FOREIGN PATENT DOCUMENTS

| | | |
|---|---|---|
| CN | 101026761 A | 8/2007 |
| CN | 101232619 A | 7/2008 |
| CN | 101420606 | 4/2009 |
| CN | 101626512 A | 1/2010 |
| CN | 101816177 | 8/2010 |
| CN | 102077594 A | 5/2011 |
| CN | 102137263 A | 7/2011 |
| CN | 102223541 | 10/2011 |
| CN | 102752595 A | 10/2012 |
| CN | 103155563 A | 6/2013 |
| CN | 103220512 A | 7/2013 |
| CN | 103237226 A | 8/2013 |
| CN | 103238332 A | 8/2013 |
| CN | 103281538 | 9/2013 |
| CN | 103392340 A | 11/2013 |
| CN | 103430540 A | 12/2013 |
| CN | 103957412 A | 7/2014 |
| CN | 104221381 A | 12/2014 |
| CN | 104244007 | 12/2014 |
| CN | 104378644 | 2/2015 |
| EP | 2664070 | 11/2013 |
| EP | 2924996 A1 | 9/2015 |
| EP | 3085083 | 10/2016 |
| EP | 3146717 | 3/2017 |
| GB | 2114404 | 8/1983 |
| JP | 2002-094805 | 3/2002 |
| JP | 2007053561 A | 3/2007 |
| JP | 2009147807 A | 7/2009 |
| JP | 2009-260473 | 11/2009 |
| JP | 2015516759 A | 6/2015 |
| KR | 20150003239 A | 1/2015 |
| RU | 2407223 | 12/2010 |
| RU | 2420021 | 5/2011 |
| WO | 2007119198 A1 | 10/2007 |
| WO | WO 2008/036112 | 3/2008 |
| WO | 2010085899 A1 | 8/2010 |
| WO | 2012159306 A1 | 11/2012 |
| WO | WO 2012/146320 | 11/2012 |
| WO | 2012174990 A1 | 12/2012 |
| WO | 2013009896 A1 | 1/2013 |
| WO | 2013072484 A1 | 5/2013 |
| WO | WO 2013/107906 | 7/2013 |
| WO | WO 2013/108922 | 7/2013 |
| WO | 2013128010 A2 | 9/2013 |
| WO | 2013154687 A1 | 10/2013 |
| WO | 2013159643 A1 | 10/2013 |
| WO | 2013160696 A1 | 10/2013 |
| WO | WO 2013/148002 | 10/2013 |
| WO | WO 2014/053099 | 4/2014 |
| WO | WO 2014/108088 | 7/2014 |
| WO | WO 2014/166104 | 10/2014 |
| WO | WO 2014/205067 | 12/2014 |
| WO | WO 2015/004441 | 1/2015 |
| WO | 2015006724 A3 | 3/2015 |
| WO | 2015114322 A1 | 8/2015 |

OTHER PUBLICATIONS

"Office Action Issued in Australian Patent Application No. 2014408228", dated Jul. 5, 2019, 3 Pages.

Zou, et al., "CE 1 Related: On Escape Pixel Coding for Palette Mode", In 20th meeting of Joint Collaborative Team on Video Coding (JCT-VC) of ITU-T SG 16 WP 3 and ISO/IEC JTC 1/SC 29/WG 11, Feb. 10, 2015, 10 Pages.

"Communication Pursuant to Rules 161(2) and 162 in European Patent Application No. 13895646.1", dated May 23, 2016, 2 Pages.

"Communication Pursuant to Rules 70(2) and 70a(2) in European Patent Application No. 13895646.1", dated May 4, 2017, 1 Page.

"International Preliminary Report on Patentability Issued in PCT Application No. PCT/CN2013/085166", dated Apr. 28, 2016, 11 Pages.

Yu et al., "New Intra Prediction Using Intra-Macroblock Motion Compensation," JVT-C151r1, May 2002, 10 pp.

Yu et al., "New Intra Prediction Using Intra-Macroblock Motion Compensation," JVT-C151d1, May 2002, 3 pp.

"Non Final Office Action Issued in U.S. Appl. No. 15/735,134", dated May 13, 2019, 48 Pages.

"Office Action Issued in Chinese Patent Application No. 201480071878. 2", dated May 7, 2019, 10 Pages.

Ma, et al., "Advanced Screen Content Coding Using Color Table and Index Map", In Proceedings of the Transactions on Image Processing, vol. 23, Issue 10, Aug. 12, 2014, pp. 4399-4412.

Joshi et al., "High Efficiency Video Coding (HEVC) Screen Content Coding: Draft 1," JCTVC-R1005-v2, 360 pp. (Aug. 2014).

Guo et al., "Palette Mode for Screen Content Coding," JCTVC-M0323, 11 pp. (Apr. 2013).

Lan et al., "Screen Content Coding," JCTVC-B084_r1, 10 pp. (2010).

Lan et al., "Screen Content Coding Results Using TMuC," JCTVC-C276_r2, 6 pp. (2010).

Li et al., "On WPP with Palette Mode and Intra BC Mode," JCTVC-S0088, 8 pp. (Oct. 2014).

Lin et al., "Compound Image Compression for Real-Time Computer Screen Image Transmission," IEEE Trans. on Image Processing, vol. 14, No. 8, pp. 993-1005 (Aug. 2005).

Misra et al., "Modifications to Palette Coding for Tiles/Slices/Dependent Slices/Wavefronts," JCTVC-R0233, 4 pp. (Jun. 2014).

(56) References Cited

OTHER PUBLICATIONS

Misra et al., "Using the Wavefront Store-and-Sync Design for Palette Table Prediction Variables," JCTVC-S0141_r1, 6 pp. (Oct. 2014).

Sullivan et al., "Meeting Report of the 18th Meeting of the Joint Collaborative Team on Video Coding (JCT-VC), Sapporo, JP, Jun. 30-Jul. 9, 2014," JCTVC-R_Notes_dE, 199 pp. (Jun. 2014).

Sullivan et al., "Meeting Report of the 19th Meeting of the Joint Collaborative Team on Video Coding (JCT-VC), Strasburg, FR, Oct. 17-24, 2014," JCTVC-S1000, 203 pp. (Oct. 2014).

Zhu et al., "RCE3 Test 2: Multi-stage Base Color and Index Map," JCTVC-N0287, 8 pp. (Jul. 2013).

Clare et al., "Wavefront Parallel Processing for HEVC Encoding and Decoding," JCTVC-F274, 16 pp. (Jul. 2011).

Kwon et al., "Fast Intra Block Copy (IntraBC) search for HEVC screen content coding," IEEE Int'l Symp. on Circuits and Systems, pp. 9-12 (Jun. 2014).

Lai et al., "Non-RCE4: Major color table (palette) merge from above and left CU," JCTVC-P0152_r2, 7 pp. (Jan. 2014).

Lai et al., "Non-RCE4: Major color table (palette) sharing," JCTVC-P0153, 6 pp. (Jan. 2014).

Pang et al., "Non-RCE3: 2-D MV Supported Intra Motion Compensation," JCTVC-N0256, 5 pp. (Jul. 2013).

Seregin et al., "Non-SCCE3: Palette predictor resetting," JCTVC-R0229r1, 4 pp. (Jun. 2014).

Yu et al., "New Intra Prediction Using Intra-Macroblock Motion Compensation," JVT-C151, 10 pp. (May 2002).

International Preliminary Report on Patentability, International Application No. PCT/CN2014/072774, 7 pages, dated Sep. 15, 2016.

Notice on the Second Office Action dated Mar. 20, 2018, from Chinese Application No. 201480029702.0, 6 pages.

"Final Office Action Issued in U.S. Appl. No. 15/640,074", dated Jun. 24, 2019, 13 Pages.

"Context-Based Adaptive Binary Arithmetic Coding in the H264/AVC Video Compression Standard", In Proceedings of IEEE Trans. on Circuits and Systems for Video Technology, vol. 13, Issue 7, Aug. 4, 2003, 17 Pages.

"H.264 Video Compression", In Proceedings of Visual Computing Systems, CMU 15-869, 2014, 29 Pages.

"Information Technology—Coding of audio-visual objects—Part 10: Advanced Video Coding", In Proceedings of International Standards ISO/IEC 14496-10, Seventh Edition, May 1, 2012, 720 Pages.

"Information Technology—JPEG 2000 Image Coding System: Core Coding System", In International Telecommunication Union ITU-T Recommendation, Telecommunication Standardization Sector of ITUISO 15444 ITU-T, T.800, Aug. 2002, 217 Pages.

"Pixel Padding Value and Pixel Padding Range Limit", Retrieved from <<https://www.dabsoft.ch/dicom/3/C.7.5.1.1.2>>, Dec. 5, 2014, 2 Pages.

"Extended Search Report Issued in European Patent Application No. 13895646.1", dated Apr. 13, 2017, 08 Pages.

"Final Office Action Issued in U.S. Appl. No. 14/176,510", dated Nov. 14, 2016, 18 Pages.

"Non-Final Office Action Issued in U.S. Appl. No. 14/176,510", dated Feb. 15, 2017, 10 Pages.

"Non-Final Office Action Issued in U.S. Appl. No. 14/176,510", dated Sep. 29, 2016, 15 Pages.

"Office Action Issued in European Patent Application No. 14903497.7", dated Jan. 5, 2018, 8 Pages.

"Supplementary Search Report Issued in European Patent Application No. 14903497.7", dated Nov. 20, 2017, 8 Pages.

"Non Final Office Action issued in U.S. Appl. No. 15/025,134", dated Jan. 3, 2019, 15 Pages.

"Final Office Action Issued in U.S. Appl. No. 15/640,074", dated Jun. 12, 2018, 11 Pages.

"Non Final Office Action Filed Issued in U.S. Appl. No. 15/640,074", dated Jan. 25, 2018, 10 Pages.

"Non Final Office Action Issued in U.S. Appl. No. 15/640,074", dated Nov. 7, 2018, 13 Pages.

"Supplementary Search Report Issued in European Patent Application No. 15894584.0", dated Oct. 22, 2018, 8 Pages.

"Office Action Issued in Australian Patent Application No. 2013403225", dated Mar. 28, 2018, 3 Pages.

"First Office Action and Search Report Issued in Chinese Patent Application No. 201380080237.9", dated Feb. 24, 2018, 14 Pages.

"Second Office Action Issued in Chinese Patent Application No. 201380080237.9", dated Oct. 25, 2018, 6 Pages.

"First Office Action and Search Report Issued in Chinese Patent Application No. 201480071878.2", dated May 3, 2018, 14 Pages.

"Second Office Action Issued in Chinese Patent Application No. 201480071878.2", dated Dec. 4, 2018, 22 Pages.

"First Office Action Issued in Chinese Patent Application No. 201580043420.0", dated Nov. 28, 2018, 13 Pages.

"Office Action Issued in Russian Patent Application No. 2016114272", dated Mar. 23, 2018, 3 Pages. (W/o English Translation).

"Office Action Issued in Russian Patent Application No. 2016114272", dated Aug. 25, 2017, 7 Pages. (W/o English Translation).

"Office Action Issued in Japanese Patent Application No. 2016-522740", dated Sep. 12, 2017, 13 Pages.

"Office Action Issued in Russian Patent Application No. 2017110397", dated Jul. 17, 2018, 11 Pages. (W/o English Translation).

"Office Action issued in Russian Patent Application No. 2017110397", dated Nov. 23, 2018, 17 Pages.

"Office Action Issued in Japanese Patent Application No. 2017-517017", dated Jun. 5, 2018, 12 Pages. (W/o English Translation).

Alshina, et al., "AhG5: Intra block copy within one LCU", In Proceedings of 15th Meeting of Joint Collaborative Team on Video Coding (JCT-VC) of ITU-T SG 16 WP 3 and ISO/IEC JTC 1/SC 29/WG 11, JCTVC-00074, Oct. 23, 2013, 5 Pages.

Alshina, et al., "AhG5: On context modelling simplification for Intra_bc_flag coding", In Proceedings of 15th Meeting of Joint Collaborative Team on Video Coding (JCT-VC) of ITU-T SG 16 WP 3 and ISO/IEC JTC 1/SC 29/WG 11, JCTVC-00073, Oct. 23, 2013, 3 Pages.

Anjanappa, Priyadarshini, "Performance Analysis and Implementation of Mode Dependent DCT/DST in H.264/AVC", In Thesis Presented to the Faculty of the Graduate School of the University of Texas in Partial Fulfillment of the Requirements for the Degree of Master of Science in Electrical Engineering, Dec. 2012, 95 Pages.

Balle, et al., "Extended Texture Prediction for H.264 Intra Coding", In Proceedings of IEEE International Conference on Image Processing, Sep. 16, 2007, pp. 93-96.

Cha, et al., "An Efficient Combined Inter and Intra Prediction Scheme for Video Coding", In Proceedings of the Conference Paper of the Signal and Information Processing Association Annual Summit and Conference, Oct. 18, 2011, 5 Pages.

Chen, et al., "AHG8: Line-Based Intra Block Copy", In 15th Meeting of the Joint Collaborative Team on Video Coding (JCT-VC) of ITU-T SG16 WP3 and ISO/IEC JTC1/SC29/WG11, JCTVC-O0205, Oct. 23, 2013, 4 Pages.

Chen, et al., "AHG8: Pseudo-PU-based Intra Block Copy", In 15th Meeting of Joint Collaborative Team on Video Coding (JCT-VC)of ITU-T SG 16 WP 3 and ISO/IEC JTC 1/SC 29/WG 11, JCTVC-00205, Oct. 23, 2013, 4 Pages.

Chen, et al., "Optimizing Intra/Inter Coding Mode Decisions", In Proceedings of International Symposium on Multimedia Information Processing, Dec. 1997, pp. 561-568.

Cugnini, Aldo, "3D CineCast—A Curation About New Media Technologies", Retrieved from http://3dcinecast.blogspot.co.uk/2013/01/a-new-more-efficient-standard-for-mpeg.html, Jan. 28, 2013, 3 Pages.

Dai, et al., "Efficient Block-Based Intra Prediction for Image Coding with 2D Geometrical Manipulations", In Proceedings of the 15th IEEE International Conference on Image Processing, Oct. 15, 2008, pp. 2916-2919.

Fernandes, et al., "Rext: On transform selection for Intra-BlockCopy blocks", In 15th Meeting Joint Collaborative Team on Video Coding (JCT-VC) of iTU-T SG 16 WP 3 and ISO/IEC JTC 1/SC 29/WG 11, JCTVC-00053, Oct. 23, 2013, 3 Pages.

Flynn, et al., "BoG Report on Range Extensions Topics", In 15th Meeting of the Joint Collaborative Team on Video Coding (JCT-

(56) References Cited

OTHER PUBLICATIONS

VC) of ITU-T SG 16 WP 3 and ISO/IEC JTC 1/SC 29/WG 11, JCTVC-O0352, Oct. 23, 2013, 48 Pages.

Flynn, et al., "High Efficiency Video Coding (HEVC) Range Extensions text specification: Draft 5", In 15th Meeting, Joint Collaborative Team on Video Coding (JCT-VC) of ITU-T SG 16 WP 3 and ISOIIEC JTC 1/SC 29/WG 11, JCTVC-O1005_v3, Oct. 23, 2013, 347 Pages.

Flynn, et al., "High Efficiency Video Coding (HEVC) Range Extensions text specification: Draft 6", In 16th Meeting, Joint Collaborative Team on Video Coding (JCT-VC), JCTVC-P1005 VL, JCT-VC OFITU-T SG 16 WP 3 and ISO/IEC JTC 1/SC 29/WG 11, Jan. 9, 2014, 355 Pages.

Flynn, et al., "Text of ISO/IEC 23008-2:201x/DAM1 HEVC Range Extensions", In International Organization for Standardization Organisation Internationale Normalisation Coding of Moving Pictures and Audio, ISO/IEC JTC1/SC29/WG11, N13763, Aug. 8, 2013, 321 Pages.

Fonseca, et al., "Open-Loop Prediction in H.264/AVC for High Definition Sequences", In Proceedings of Brazilian Telecommunication Symposium, Sep. 3, 2007, 4 Pages.

Forni, et al., "On the Benefits of Leaf Merging in Quad-Tree Motion Models", In Proceedings of the IEEE International Conference on Image Processing, vol. 2, Sep. 14, 2005, 4 Pages.

He, et al., "Non-CE6: Redundancy removal and simplification for Palette coding", Joint Collaborative Team on Video Coding of ISO/IEC JTC1/SC29/WG11 and ITU-T SG16, JCTVC-S0173, Oct. 17, 2014, 7 Pages.

Hu, et al., "Screen Content Coding for HEVC Using Edge Modes", In Proceedings of IEEE International Conference on Acoustics, Speech and Signal Processing, May 26, 2013, 7 Pages.

Hwang, et al., "Fast Intra Prediction Mode Selection Scheme Using Temporal Correlation in H.264", In Proceedings the Annual International Conference of the Tencon, Nov. 21, 2005, 5 Pages.

Iwata, et al., "Intra Prediction Based on Repetitive Pixel Replenishment with Adaptive Block Size", In 4th Meeting of the Joint Collaborative Team on Video Coding (JCT-VC) of ITU-T SG16 WP3 and ISO/IEC JTC1/SC29/WG11, JCTVC-D251, WG11 No. m19014, Jan. 20, 2011, 4 Pages.

Iwata, et al., "Infra Texture Prediction Based on Repetitive Pixel Replenishment", In Proceedings of 19th IEEE International Conference on Image Processing, Sep. 30, 2012, pp. 2933-2936.

Bankoski et al., "VP8 Data Format and Decoding Guide," RFC 6386, 304 pp. (Nov. 2011).

Dai et al., "Combined Inter-Frame and Inter-Color Prediction for Color Video Denoising," *IEEE Int'l Conf. on Multimedia and Expo*, pp. 884-889 (Jul. 2012).

Flynn et al., "High Efficiency Video Coding (HEVC) Range Extensions text specification: Draft 3," JCTVC-M1005_v1, 315 pp. (Apr. 2013).

Flynn et al., "High Efficiency Video Coding (HEVC) Range Extensions text specification: Draft 4," JCTVC-N1005_v1, 322 pp. (Apr. 2013).

Guo, "RCE3: Summary Report of HEVC Range Extensions Core Experiment 3 on Intra Coding Methods for Screen Content," JCTVC-N0036, 4 pp. (Jul. 2013).

International Search Report and Written Opinion dated Dec. 5, 2014, from International Patent Application No. PCT/CN2014/072774, 15 pp.

ISO/IEC 11172-2, "Information technology—Coding of moving pictures and associated audio for digital storage media at up to about 1,5 Mbit/s—Part 2: Video," 122 pp. (Aug. 1993).

ISO/IEC 14496-2, "Information Technology—Coding of Audio-Visual Objects: Visual," ISO/IEC JTC1/SC29/WG11 N2202, 327 pp. (Mar. 1998).

ITU-T Recommendation H.261, "Video Codec for Audiovisual Services at p×64 kbits," 29 pp. (Mar. 1993).

ITU-T Recommendation H.262, "Generic Coding of Moving Pictures and Associated Audio Information: Video," 218 pp. (Jul. 1995).

ITU-T Recommendation H.263, "Video coding for low bit rate communication," 167 pp. (Feb. 1998).

ITU-T Recommendation H.264, "Advanced video coding for generic audiovisual services," 680 pp. (Jan. 2012).

ITU-T Recommendation H.265, "High efficiency video coding," 317 pp. (Apr. 2013).

Kang et al., "Efficient Dictionary Based Video Coding with Reduced Side Information," *Int'l Symp. on Circuits and Systems*, 6 pp. (May 2011).

Lan et al., "Compress Compund Images in H.264/MPGE-4 AVC by Exploiting Spatial Correlation," *IEEE Trans. on Image Processing*, vol. 19, No. 4, pp. 946-957 (Apr. 2010).

Lan et al., "Compression of Compound Images by Combining Several Strategies," *IEEE Int'l Workshop on Multimedia Signal Processing*, 6 pp. (Oct. 2011).

Lan et al., "Improving Depth Compression in HEVC by Pre/Post Processing," *IEEE Int'l Conf. on Multimedia and Expo Workshop*, pp. 611-616 (Jul. 2012).

Meenderinck et al., "Parallel Scalability of H.264," *Workshop on Programmability Issues for Multi-Core Computers*, 12 pp. (Jan. 2008).

Pan et al., "A Low-Complexity Screen Compression Scheme," *VCIP*, 6 pp. (Nov. 2012).

Pan et al., "A Low-Complexity Screen Compression Scheme for Interactive Screen Sharing," *IEEE Trans. on Circuits and Systems for Video Technology*, vol. 23, No. 6, pp. 949-960 (Jun. 2013).

Peng et al., "Exploiting Inter-frame Correlations in Compound Video Coding," *IEEE Visual Communications and Image Processing*, 4 pp. (Nov. 2011).

Pourazad et al., "HEVC: The New Gold Standard for Video Compression," *IEEE Consumer Electronics Magazine*, pp. 36-46 (Jul. 2012).

Pu et al., "SCCE3: Test B.12—Binarization of Escape Sample and Palette Index," JCTVC-R0065, 3 pp. (Jun. 2014).

Saxena et al., "HEVC Range Extensions Core Experiment 3 (RCE3): Intra Prediction techniques," JCTVC-N1123, 7 pp. (Jul. 2013).

Shen et al., "A High-Performance Remote Computing Platform," *IEEE Int'l Conf. on Pervasive Computing and Communications*, 6 pp. (Mar. 2009).

SMPTE Standard, "VC-1 Compressed Video Bitstream Format and Decoding Process," SMPTE 421M-2006, 493 pp. (Feb. 2006).

Sullivan et al., "Overview of the High Efficiency Video Coding (HEVC) Standard," *IEEE Trans. on Circuits and Systems for Video Technology*, vol. 22, No. 12, pp. 1649-1668 (Dec. 2012).

Xiu et al., "Palette-based Coding in the Screen Content Coding Extension of the HEVC Standard," *IEEE Data Compresion Conf.*, pp. 253-262 (Apr. 2015).

Zhao et al., "Efficient Realization of Parallel HEVC Intra Encoding," Int'l Workshop on Programmability on Emerging Multimedia Systems and Applications, 6 pp. (Jul. 2013).

Jin, et al., "Combined Inter-Intra Prediction for High Definition Video Coding", In Proceeding of Picture Coding Symposium, Nov. 2007, 4 Pages.

Kim, et al., "High Efficiency Video Coding (HEVC) Test Model13 (HM13) Encoder Description", In Proceedings of 15th Meeting of Joint Collaborative Team on Video Coding (JCT-VC) of ITU-T SG 16 WP 3 and ISO/IEC JTC 1/SC 29/WG 11, JCTVC-O1002, Oct. 23, 2013, 36 Pages.

Kwon, et al., "AHG5: Fast Encoding Using Early Skipping of Intra Block Copy (IntraBC) Search", In 15th meeting, Joint Collaborative Team on Video Coding (JCT-VC) of ITU-T SG16 WP3 and ISO/IEC JTC1/SC29/WG11, Document JCTVC-O0245, Oct. 23, 2013, 12 Pages.

Kwon, et al., "Non-RCE3: Intra motion compensation with variable length intra MV coding", In 14th Meeting of Joint Collaborative Team on Video Coding (JCT-VC) of ITU-T SG16 WP3 and ISO/IEC JTC1/SC29/WG1, JCTVC-N0206, Jul. 25, 2013, 11 Pages.

Kwon, et al., "RCE3: Results of test 3.3 in Intra motion compensation", In 14th Meeting of Joint Collaborative Team on Video Coding (JCT-VC) of ITU-T SG 16 WP 3 and ISO/IEC JTC 1/SC 29/WG 11, JCTVC-N0205, Jul. 25, 2013, 8 Pages.

Lai, et al., "AHG14: Intra Block Copy Reference Area for Wavefront Parallel Processing", In Proceedings of 19th Meeting of Joint

(56) References Cited

OTHER PUBLICATIONS

Collaborative Team on Video Coding (JCT-VC) of ITU-T SG 16 WP 3 and ISO/IEC JTC 1/SC 29/WG 11, JCTVC-S0101, Oct. 17, 2014, 4 Pages.
Misra, et al., "Using flat scaling lists for escape coded palette pixels", In Joint Collaborative Team on Video Coding (JCT-VC) of ITU-T SG 16 WP 3 and ISO/IEC JTC 1/SC 29/WG11, JCTVC-S0139, Oct. 17, 2014, 4 Pages.
"Office Action Issued in Mexican Patent Application No. MX/a/2016/004707", dated Oct. 11, 2018, 5 Pages. (W/o English Translation).
"International Preliminary Report on Patentability Issued in PCT Application No. PCT/CN2014/080302", dated Dec. 29, 2016, 6 Pages.
"International Preliminary Report on Patentability Issued in PCT Application No. PCT/CN2015/081039", dated Dec. 21, 2017, 5 Pages.
"International Preliminary Report on Patentability Issued in PCT Application No. PCT/US2016/013500", dated Apr. 5, 2017, 9 Pages.
Sole, et al., "Non-CE6: Delta QP signalling for palette", In 19th Meeting of Joint Collaborative Team on Video Coding (JCT-VC) of ITU-T SG 16 WP 3 and ISO/IEC JTC 1/SC/WG 11, JCTVC-S0043-r2, Oct. 22, 2014, 3 Pages.
Zhu, et al., "Screen Content Coding Using 2-D Dictionary Mode", In 15th Meeting of Joint Collaborative Team on Video Coding (JCT-VC) of ITU-T SG 16 WP 3 and ISO/IEC JTC 1/SC 29/WG 11, JCTVC-O0355, Oct. 23, 2013, 4 Pages.
Guo et al., "AHG8: Major-color-based screen content coding," JCTVC-O0182, 7 pp. (Oct. 2013).
Guo et al., "Evaluation of Palette Mode Coding on HM-12.0+Rext-4.1," JCTVC-O0218, 6 pp. (Oct. 2013).
Joshi et al., "AHG8: Use of inter RDPCM for blocks using intra block copy mode," JCTVC-O0170, 2 pp. (Oct. 2013).
Xu et al., "Non-RCE3: base color merging for MBCIM," JCTVC-N0235, 7 pp. (Jul. 2013).
Zhu et al., "AhG8: Screen Content Coding with Multi-stage Base Color and Index Map," JCTVC-M0330, 6 pp. (Apr. 2013).
Zhu et al., "Template-based palette prediction," JCTVC-N0169, 6 pp. (Apr. 2013).
"Non Final Office Action Issued in U.S. Appl. No. 15/515,559", dated Apr. 22, 2019, 14 Pages.
"Non Final Office Action Issued in U.S. Appl. No. 15/640,074", dated Mar. 8, 2019, 13 Pages.
"Office Action Issued in Australian Patent Application No. 2014408228", dated Apr. 5, 2019, 4 Pages.
First Office Action and Search Report, Chinese Patent Application No. 201480029702.0, dated Sep. 29, 2017, 15 Pages.
Gisquet et al., "SCCE3 Test A.3: palette stuffing," JCTVC-R0082, pp. 1-5 (Jun. 2014).
Guo et al., "Color Palette for Screen Content Coding," ICIP 2014, 5 pp. (2014).
Guo, "RCE3: Results of Test 3.1 on Palette Mode for Screen Content Coding," JCTVC-N0247, 7 pp. (Jul. 2013).
Sun et al., "AHG10: A triplet palette mode combining JCTVC-P0108 and JCTVC-P0198," JCTVC-Q0083, pp. 1-9 (Mar. 2014).
Sun et al., "Non-RCE4: Cross-CU major color index prediction," JCTVC-P0093r2, pp. 1-5 (Jan. 2014).
European Search Report, European Application No. 14884822.9, 6 pages, dated Feb. 3, 2017.
European Examination Report, European Application No. 14884822.9, 6 pages, dated Feb. 21, 2017.
Zhang et al., "Screen Content Coding by Combined Full-chroma LZMA and Subsampled-chroma HEVC," *Journal of Electronics and Information Technology*, vol. 35, No. 1, pp. 196-202, Feb. 17, 2014.
Salomon, "Data Compression: The complete reference," In 2007, Springer, pp. 241-246.

Brittain et al., "Grayscale Two-Dimensional Lempel-Ziv Encoding," *Image Analysis and Recognition Lecture Notes in Computer Science*, Springer, Berlin, DE, pp. 328-334, Jan. 1, 2005.
Lin et al., "Pseudo-2D-Matching Based Dual-Coder Architecture for Screen Contents Coding," *2013 IEEE International Conference on Multimedia and Expo Workshops (ICMEW)*, http://ieeexplore.ieee.org/stamp/stamp.jsp?arnumber=6618315, Jul. 15-19, 2013, 4 pages (retrieved Jan. 11, 2017).
Rodrigues et al., "Improving H.264/AVC Inter Compression with Multiscale Recurrent Patterns," *2006 IEEE International Conference on Image Processing*, http://ieeexplore.ieee.org/stamp/stamp.jsp?arnumber=4106789, Oct. 8-11, 2006, pp. 1353-1356 (retrieved Jan. 9, 2017).
Chang et al., "Intra Line Copy for HEVC Screen Content Coding," *2014 Annual Summit and Conference Asia-Pacific Signal and Information Processing Association (APSIPA)*, http://ieeexplore.ieee.org/document/7041533/, Dec. 12, 2014, 8 pages (retrieved on Jan. 11, 2017).
"Office Action Issued in European Patent Application No. 14884822.9", dated Feb. 8, 2019, 5 Pages.
"Office Action Issued in Japanese Patent Application No. 2017-517017", dated Jan. 22, 2019, 10 Pages.
Joshi, et al., "High Efficiency Video Coding (HEVC) Screen Content Coding: Draft 3", In 20th Meeting of Joint Collaborative Team on Video Coding (JCT-VC) of ITU-T SG 16 WP 3 and ISO/IEC JTC 1/SC 29/WG 11, Feb. 10, 2015, 563 Pages.
Lainema, et al., "AHG5: Sample masking for intra block copy", In 15th Meeting of Joint Collaborative Team on Video Coding (JCT-VC) of ITU-T SG 16 WP 3 and ISO/IEC JTC 1/SC 29/WG 11, JCTVC-O0351, Oct. 23, 2013, 3 Pages.
Lainema, et al., "Intra Coding of the HEVC Standard", In Proceedings of IEEE Transactions on Circuits and Systems for Video Technology, vol. 22, Issue 12, Dec. 1, 2012, pp. 1792-1801.
Lan, et al., "Intra and Inter coding tools for screen contents", In Proceedings of the Joint Collaborative Team on Video Coding(JCT-VC) of ITU-T SG16 WP3 and ISO/IEC JTC1/SC29/WG11, JCTVC-E145, Mar. 16, 2011, 11 Pages.
Laroche, et al., "AHG14: On IBC Constraint for Wavefront Parallel Processing", In Proceedings of 19th Meeting of Joint Collaborative Team on Video Coding (JCT-VC) of ITU-T SG 16 WP 3 and ISO/IEC JTC 1/SC 29/WG 11, JCTVC-S0070, Oct. 17, 2014, 5 Pages.
Laroche, et al., "AHG5: Motion prediction for Intra Block Copy", In 15th Meeting of Joint Collaborative Team on Video Coding (JCT-VC) of ITU-T SG 16 WP 3 and ISO/IEC JTC 1/SC 29/WG 11, JCTVC-O0122, Oct. 23, 2013, 5 Pages.
Laroche, et al., "Text and results for block vector predictor for intra block copy", In 16th Meeting, Joint Collaborative Team on Video Coding (JCT-VC) of ITU-T SG 16 WP 3 and ISO/IEC JTC 1/SC 29/WG 11, JCTVC-P0304_r1, Jan. 9, 2014, 3 Pages.
Li, et al. "Hash-based intraBC search", In 17th Meeting, Joint Collaborative Team on Video Coding (JCT-VC) of ITU-T SG 16 WP 3 and ISO/IEC JTC 1/SC 29/WG 11, JCTVC-Q0252, Mar. 27, 2014, 2 Pages.
Li, et al., "On Intra BC mode", In Proceedings of 15th Meeting of Joint Collaborative Team on Video Coding (JCT-VC) of ITU-T SG 16 WP 3 and ISO/IEC JTC 1/SC 29/WG 11, JCTVC-O0183_r1, Oct. 23, 2013, 12 Pages.
Li, et al., "On the Palette Escape Pixel Coding", In 21st meeting of Joint Collaborative Team on Video Coding (JCT-VC) of ITU-TSG 16 WP 3 and ISO/IEC JTC 1/SC 29/WG 11, Jun. 19, 2015, 9 Pages.
Li, et al., "RDPCM operation unification and cleanup", In 15th Meeting Joint Collaborative Team on Video Coding (JCT-VC) of ITU-T SG 16 WP 3 and ISO/IEC JTC 1/SC 29/WG 11, JCTVC-O0185, Oct. 23, 2013, 6 Pages.
Liao, et al., "A Low Complexity Architecture for Video Coding with Overlapped Block Motion Compensation", In Proceedings of IEEE 17th International Conference on Image Processing, Sep. 26, 2010, pp. 2041-2044.
Madhukar, Budagavi, "AHG8: Video coding using Intra motion compensation", In Proceedings of 13th Meeting of Joint Collabora-

(56) References Cited

OTHER PUBLICATIONS tive Team on Video Coding (JCT-VC) of ITU-T SG 16 WP 3 and ISO/IEC JTC 1/SC 29/WG 11, Document JCTVC-M0350, Apr. 18, 2013, 3 Pages.

Marpe, et al., "Video Compression Using Nested Quadtree Structures, Leaf Merging and Improved Techniques for Motion Representation and Entropy Coding", In Proceedings of IEEE Transactions on Circuits and Systems for Video Technology, vol. 20, Issue 12, Dec. 2010, 10 Pages.

McCann, et al., "Samsung's Response to the Call for Proposals on Video Compression Technology", In Proceedings of the 1st Meeting, Joint Collaborative Team on Video Coding (JCT-VC) of ITU-T SG16 WP3 and ISO/IEC JTC1/SC29/WG11, JCTVC-A124, Apr. 15, 2010, 40 Pages.

Meur, O Le., "Video compression Beyond H.264, HEVC", In Proceedings of Powerpoint Presentation, University of Rennes 1, Nov. 7, 2011, 65 Pages.

Min, et al., "Non-RCE3: Intra motion compensation for screen contents", In 14th Meeting of Joint Collaborative Team on Video Coding (JCT-VC) of ITU-T SG 16 WP 3 and ISO/IEC JTC 1/SC 29/WG 11, JCTVC-N0285, Jul. 25, 2013, 3 Pages.

"Office Action Issued in Mexican Patent Application No. MX/a/2016/004707", dated Feb. 8, 2018, 4 Pages. (W/o English Translation).

Naccari, et al., "AHG 8 Cross-check for JCTVC-N0231: Intra mode coding for screen contents", In 14th Meeting of Joint Collaborative Team on Video Coding (JCT-VC) of ITU-T SG 16 WP 3 and ISO/IEC JTC 1/SC 29/WG 11, JCTVC-N0322, Jul. 25, 2013, 3 Pages.

Ohm, et al., "Comparison of the Coding Efficiency of Video Coding Standards—Including High Efficiency Video Coding (HEVC)", In Proceedings of IEEE Transactions on Circuits and Systems for Video Technology, vol. 22, Issue 12, Dec. 2012, pp. 1669-1684.

Oudin, et al., "Block Merging for Quadtree-Based Video Coding", In Proceedings of IEEE International Conference on Multimedia and Expo, Jul. 11, 2011, 6 Pages.

Pang, et al., "AhG5: Constrained intra prediction for intra block copying", In 15th Meeting of Joint Collaborative Team on Video Coding (JCT-VC) of ITU-T SG 16 WP 3 and ISO/IEC JTC 1/SC 29/WG 11, Oct. 23, 2013, 6 Pages.

Pang, et al., "AhG5: Intra block copying with padding", In Proceedings of 15th Meeting of Joint Collaborative Team on Video Coding (JCT-VC) of ITU-T SG 16 WP 3 and ISO/IEC JTC 1/SC 29/WG 11, JCTVC-O0157, Oct. 23, 2013, 6 Pages.

Pang, et al., "Non-RCE3: Intra Motion Compensation with 2-D MVs", In 14th Meeting, Joint Collaborative Team on Video Coding (JCT-VC) of ITU-T SG 16 WP 3 and ISO/IEC JTC 1/SC 29/WG 11, JCTVC-N0256, Jul. 25, 2013, 12 Pages.

Pang, et al., "Non-RCE3: Pipeline Friendly Intra Motion Compensation", In 14th Meeting Joint Collaborative Team on Video Coding (JCT-VC) of ITU-T SG 16 WP 3 and ISO/IEC JTC 1/SC 29/WG 11, JCTVC-N0254, Jul. 25, 2013, 9 Pages.

"International Search Report and Written Opinion Issued in PCT Application No. PCT/CN2013/085166", dated Aug. 5, 2014, 20 Pages.

"International Search Report and Written Opinion Issued in PCT Application No. PCT/CN2014/087885", dated Jun. 15, 2015, 13 Pages.

"International Search Report and Written Opinion Issued in PCT Application No. PCT/CN2015/081039", dated Mar. 1, 2016, 11 Pages.

"International Search Report and Written Opinion Issued in PCT Application No. PCT/US2015/014461", dated Apr. 13, 2015, 10 Pages.

Zhu, et al., "Ping-Pong block vector predictor for intra block copy", In 17th Meeting, Joint Collaborative Team on Video Coding (JCT-VC) of ITU-T SG 16 WP 3 and ISO/IEC JTC 1/SC 29/WG 11, JCTVC-Q0134, Mar. 27, 2014, 5 Pages.

Zhu, et al., "Non-RCE3 subtest B.2—Results and Search Methods for Intra block copying for CU-level block vectors with TU-level prediction processing", In 16th Meeting, Joint Collaborative Team on Video Coding (JCT-VC) of ITU-T SG 16 WP 3 and ISO/IEC JTC 1/SC 29/WG 11, JCTVC-P0218, Jan. 9, 2014, 3 Pages.

Rapaka, et al., "On Parallel Processing Capability of Intra Block Copy", In Proceedings of 19th Meeting of Joint Collaborative Team on Video Coding (JCT-VC) of ITU-T SG 16 WP 3 and ISO/IEC JTC 1/SC 29/WG 11, JCTVC-S0220, Oct. 17, 2014, 5 Pages.

Robert, et al., "Improving Intra mode coding in H.264/AVC through block oriented transforms", In Proceedings of IEEE 8th Workshop on Multimedia Signal Processing, Oct. 3, 2006, 5 Pages.

Sahin, et al., "An Efficient Hardware Architecture for H.264 Intra Prediction Algorithm", In Proceedings of Design, Automation & Test in Europe Conference & Exhibition, Apr. 16, 2007, 6 Pages.

Sarwer, et al., "Improved Intra Prediction of H.264/AVC", In Proceedings of Effective Video Coding for Multimedia Applications, Apr. 2011, pp. 39-54.

Saxena, et al., "Mode Dependent DCT/DST for Intra Prediction in Block-Based Image/Video Coding", In Proceedings of 18th IEEE Internationall Conference on Image Processing, Sep. 11, 2011, pp. 1685-1688.

Sharman, et al., "AHG5: Intra-block-copy in Non-4:4:4 Formats", In 17th Meeting of Joint Collaborative Team on Video Coding (JCT-VC) of ITU-T 16 WP 3 and ISO/IEC JTC 1/SC 29/WG 11, JCTVC-Q0075, Mar. 27, 2014, 5 Pages.

Sole, et al., "HEVC Range Extensions Core Experiment 3 (RCE3): Intra Block copy refinement", In 15th Meeting of Proceedings of Joint Collaborative Team on Video Coding (JCT-VC) of ITU-T SG 16 WP 3 and ISO/IEC JTC 1/SC 29/WG 11, JCTVC-O1123, Oct. 23, 2013, 6 Pages.

Sullivan, et al., "Meeting report of the 14th meeting of the Joint Collaborative Team on Video Coding", In 14th Meeting, Joint Collaborative Team on Video Coding (JCT-VC) of ITU-T SG16 WP3 and ISO/IEC JTC1/SC29/WG11, JCTVC-N Notes dA, Jul. 25, 2013, 162 Pages.

Sullivan, et al., "Meeting report of the 21st meeting of the Joint Collaborative Team on Video Coding (JCT-VC)", In 21st meeting of the Joint Collaborative Team on Video Coding (JCT-VC) of ITU-T SG 16 WP 3 and ISO/IEC JTC 1/SC 29/WG 11, Jun. 19, 2015, 121 Pages.

Tseng, et al., "A Motion Vector Coding Scheme Based on Bottom-Up Merging Procedure", In Proceedings of the First International Conference on Advances in Multimedia, Jul. 20, 2009, pp. 125-129.

Xu, et al., "Intra-predictive Transforms for Image Coding", In Proceedings of IEEE International Symposium on Circuits and Systems, May 24, 2009, pp. 2822-2825.

Xu, et al., "On Unification of Intra Block Copy and Inter-picture Motion Compensation", In 16th Meeting of the Joint Collaborative Team on Video Coding (JCT-VC) of ITU-T SG16 WP3 and ISO/IEC JTC 1/SC 29/WG11, JCTVC-Q0132, Jan. 9, 2014, 14 Pages.

Yang, Shih-Hsuan, "HEVC (High Efficiency Video Coding)", In Proceedings of TaipeiTech, CSIE Department, Retrieved Date: Dec. 4, 2014, 66 Pages.

Yang, et al., "Remote Dynamic Three-Dimensional Scene Reconstruction", In Journal of PLOS One, vol. 8, Issue 5, May 7, 2013, 12 Pages.

"International Preliminary Report on Patentability Issued in PCT Application No. PCT/CN2014/087885", dated Apr. 13, 2017, 6 Pages.

Zhang, et al., "Motion Vector Derivation of Deformable Block", In Proceedings of IEEE International Conference on Image Processing, Sep. 30, 2012, pp. 1549-1552.

Zhu et al., "AMP for Intra BC prediction", In 17th Meeting, Joint Collaborative Team on Video Coding (JCT-VC) of ITU-T SG 16 WP 3 and ISO/IEC JTC 1/SC 29/WG 11, JCTVC-Q0135, Mar. 27, 2014, 3 Pages.

Zhu, et al., "Initialization of block vector predictor for intra block copy", In 16th Meeting, Joint Collaborative Team on Video Coding (JCT-VC) of ITU-T SG 16 WP 3 and ISO/IEC JTC 1/SC 29/WG 11, JCTVC-P0217-v2, Jan. 9, 2014, 7 Pages.

Zou, "CE 1 Related: On Escape Pixel Coding for Palette Mode", In 20th meeting of Joint Collaborative Team on Video Coding (JCT-VC) of ITU-T SG 16 WP 3 and ISO/IEC JTC 1/SC 29/WG 11, Feb. 10, 2015, 5 Pages.

(56) References Cited

OTHER PUBLICATIONS

Zou, et al., "View Synthesis Prediction Using Skip and Merge Candidates for HEVC-based 3D Video Coding", In Proceedings of IEEE International Symposium Circuits and Systems, May 19, 2013, 6 Pages.

Chen et al., "Description of Screen Content Coding Technology Proposal by NCTU and ITRI International," JCTVC-Q0032-r1, 26 pp. (Mar. 2014).

Chen et al., "Description of Screen Content Coding Technology Proposal by Qualcomm," JCTVC-Q0031, 18 pp. (Mar. 2014).

Cohen et al., "Description of Screen Content Coding Technology Proposal by Mitsubishi Electric Corporation," JCTVC-Q0036, 25 pp. (Mar. 2014).

Ding et al., "Enable Efficient Compound Image Compression in H.264/AVC Intra Coding," IEEE Int'l Conf. on Image Processing, 4 pp. (Sep. 2007).

Lai et al., "Description of Screen Content Coding Technology Proposal by MediaTek," JCTVC-Q0033_r1, 31 pp. (Mar. 2014).

Li et al., "Description of Screen Content Coding Technology Proposal by Microsoft," JCTVC-Q0035, 27 pp. (Mar. 2014).

Lu et al., "Virtualized Screen: A Third Element for Cloud-Mobile Convergence," IEEE Multimedia vol. 18, Issue 2, 8 pp. (Feb. 2011).

Ma et al., "Description of Screen Content Coding Technology Proposal by Huawei Technologies, Inc.," JCTVC-Q0034, 14 pp. (Mar. 2014).

Miao et al., "Layered Screen Video Coding Leveraging Hardware Video Codec," IEEE Int'l Conf. on Multimedia and Expo, 6 pp. (Jul. 2013).

Mrak et al., "Improving Screen Content Coding in HEVC by Transform Skipping," Proc. European Signal Processing Conf., 5 pp. (Aug. 2012).

Shen et al., "Classification-Based Adaptive Compression Method for Computer Screen Image," IEEE Int'l Conf. on Multimedia and Expo Workshops, 6 pp. (Jul. 2012).

Shen et al., "Low-Cost Real-Time Screen Sharing to Multiple Clients," IEEE Int'l Conf. on Multimedia and Expo, 6 pp. (Jul. 2010).

Strom et al., "Medical Image Compression with Lossless Regions of Interest," Signal Processing, vol. 59, Issue 2, 17 pp. (Jun. 1997).

Xiu et al., "Description of Screen Content Coding Technology Proposal by InterDigital," JCTVC-Q0037, 30 pp. (Mar. 2014).

\* cited by examiner software 180 implementing one or more innovations for 1-D, pseudo 2-D, and/or inter pseudo 2-D dictionary mode coding

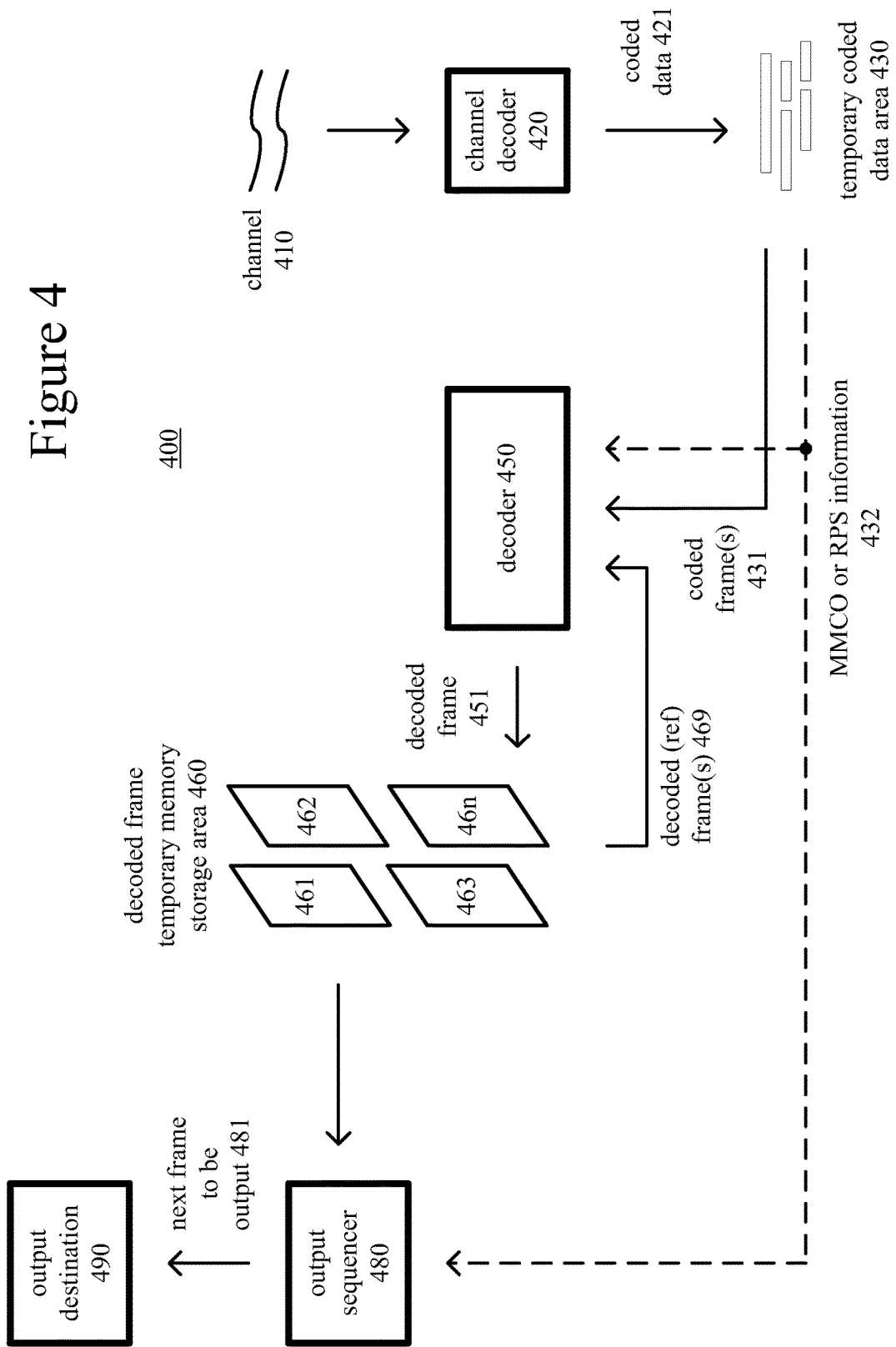

500

600

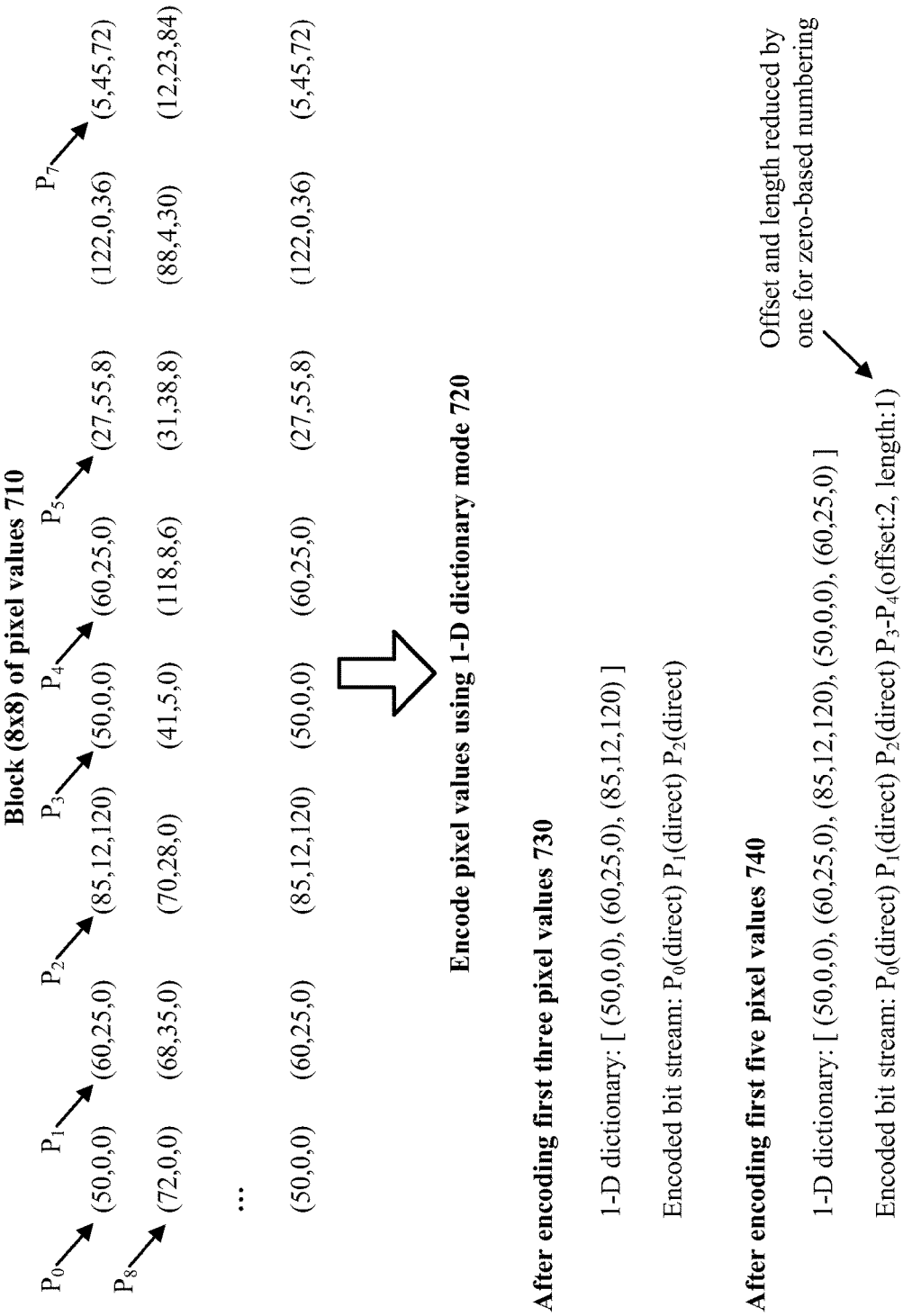

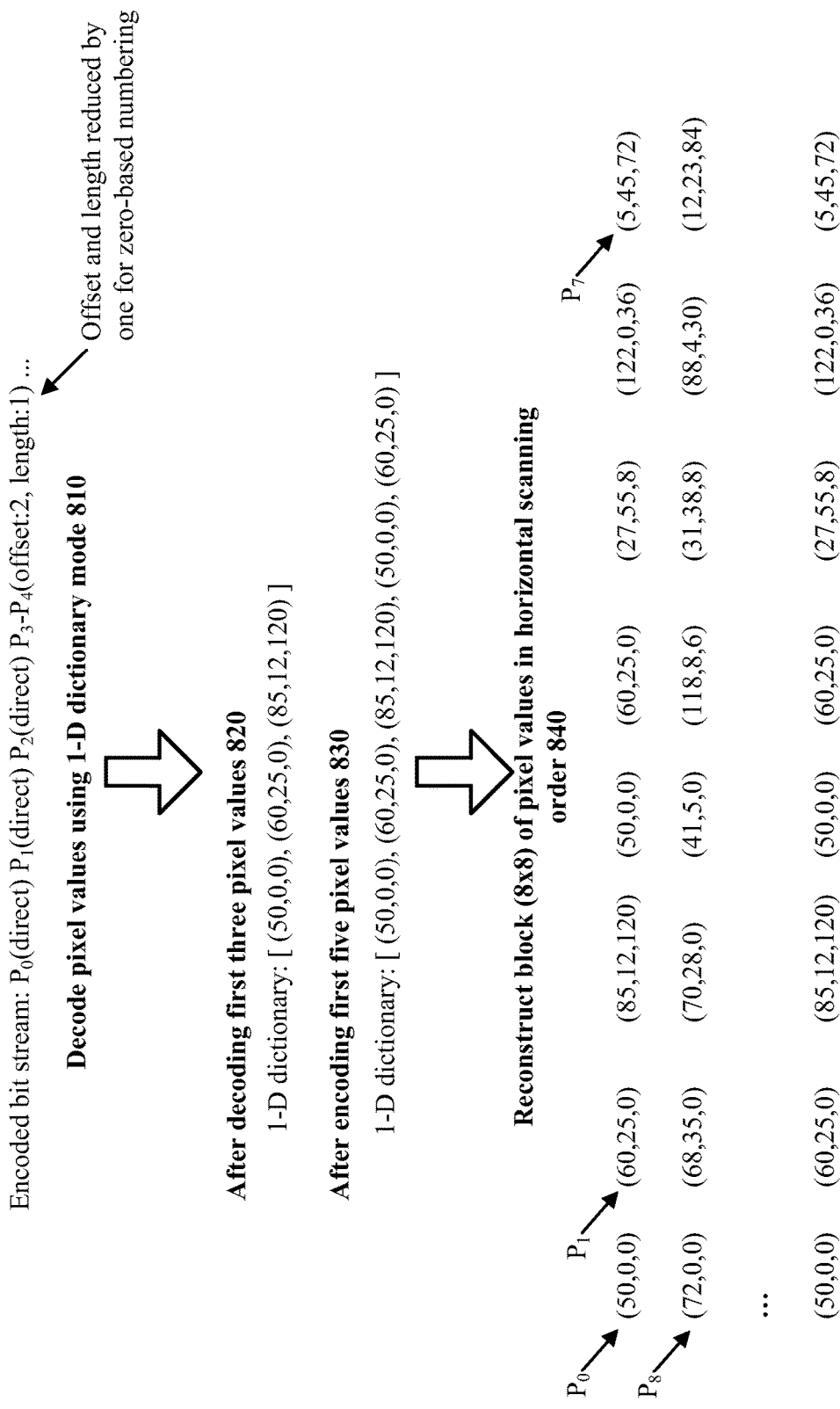

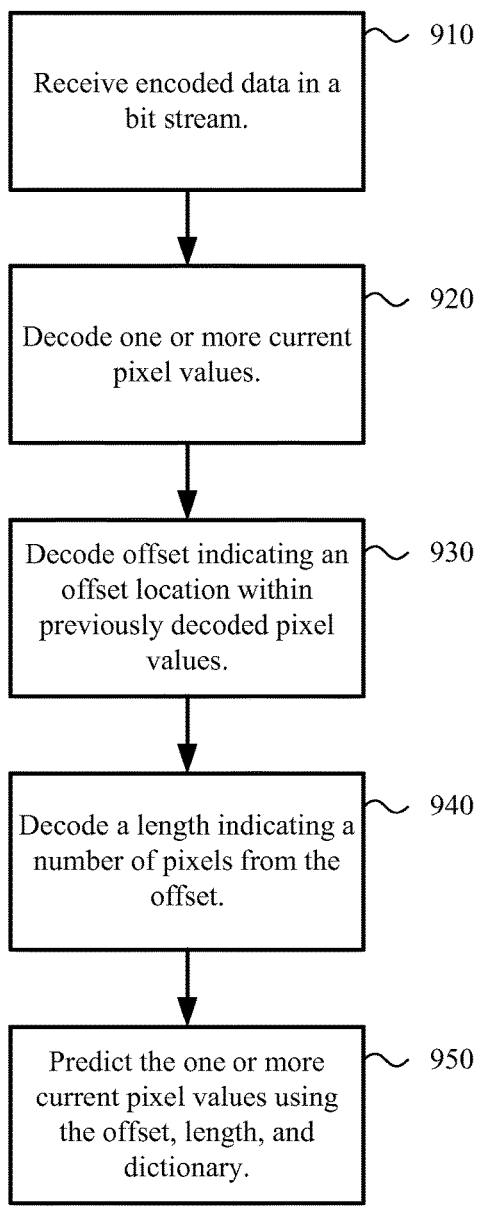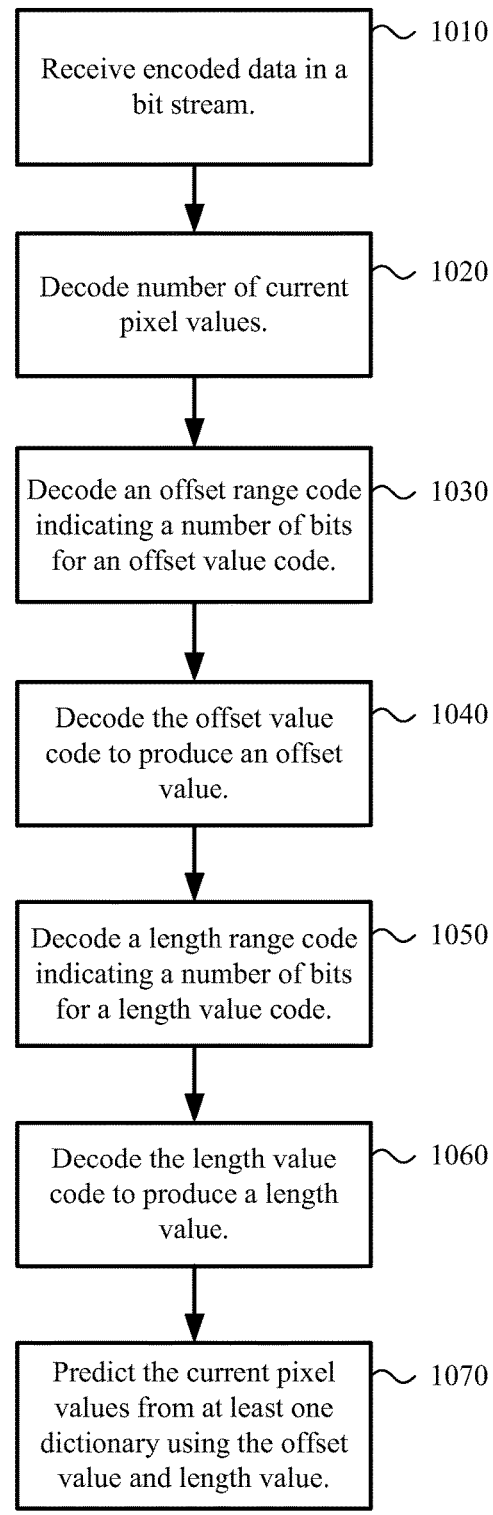

DICTIONARY ENCODING AND DECODING OF SCREEN CONTENT

CROSS REFERENCE TO RELATED APPLICATIONS

This is the U.S. National Stage of International Application No. PCT/CN2014/072774, filed Mar. 4, 2014, which was published in English under PCT Article 21(2), and which is incorporated herein in its entirety.

BACKGROUND

Engineers use compression (also called source coding or source encoding) to reduce the bit rate of digital video. Compression decreases the cost of storing and transmitting video information by converting the information into a lower bit rate form. Decompression (also called decoding) reconstructs a version of the original information from the compressed form. A "codec" is an encoder/decoder system.

Over the last two decades, various video codec standards have been adopted, including the ITU-T H.261, H.262 (MPEG-2 or ISO/IEC 13818-2), H.263 and H.264 (MPEG-4 AVC or ISO/IEC 14496-10) standards, the MPEG-1 (ISO/IEC 11172-2) and MPEG-4 Visual (ISO/IEC 14496-2) standards, and the SMPTE 421M standard. More recently, the HEVC standard (ITU-T H.265 or ISO/IEC 23008-2) has been approved. Extensions to the HEVC standard (e.g., for scalable video coding/decoding, for coding/decoding of video with higher fidelity in terms of sample bit depth or chroma sampling rate, or for multi-view coding/decoding) are currently under development. A video codec standard typically defines options for the syntax of an encoded video bitstream, detailing parameters in the bitstream when particular features are used in encoding and decoding. In many cases, a video codec standard also provides details about the decoding operations a decoder should perform to achieve conforming results in decoding. Aside from codec standards, various proprietary codec formats define other options for the syntax of an encoded video bitstream and corresponding decoding operations.

Encoding and decoding of specific types of content, such as screen content, can present different challenges from coding normal video content. For example, screen content can include areas of similar content (e.g., large graphical areas with the same color or a smooth gradient) and areas of repeated content. Encoding and decoding such content using normal video coding techniques can produce results that are inefficient and that reduce quality (e.g., by producing compression artifacts).

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques are described for improving efficiency of encoding and/or decoding of video and/or image data. In some innovations, a one-dimensional (1-D) dictionary mode is used to encode and/or decode pixel values using previous pixel values (e.g., previously reconstructed or previously decoded pixel values) stored in a 1-D dictionary. In the 1-D dictionary mode, current pixel values can be predicted (e.g., predicted exactly, without requiring any residual) using an offset that identifies a location within the 1-D dictionary and a length indicating a number of pixel values being predicted.

In other innovations, a pseudo 2-D dictionary mode is used to encode and/or decode pixel values using previous pixel values (e.g., previously reconstructed or previously decoded pixel values). In the 2-D dictionary mode, current pixel values can be predicted (e.g., predicted exactly, without requiring any residual) using an X and Y offset and a length. An inter pseudo 2-D dictionary mode can also be used to encode and/or decode pixel values using pixel values in a reference picture (e.g., identified within the reference picture by an X and Y offset and a length from a corresponding pixel location in the reference corresponding to a current pixel location in a current picture being encoded or decoded).

In other innovations, an encoder calculates hash values for previously encoded pixel values (e.g., for every 1, 2, 4, and 8 pixel values). Current pixel values being encoded are then matched against the previously encoded pixel values by creating a hash of the current pixel values and matching the hash values.

The technologies described herein can be applied to coding of screen content. Screen content refers to video and/or image content that is computer-generated (e.g., text, graphics, and/or other artificial content that is computer-generated). An example of screen content is an image of a computer desktop graphical user interface comprising text, icons, menus, windows, and/or other computer text and graphics. The technologies described herein can also be applied to content other than screen content.

The foregoing and other objects, features, and advantages of the invention will become more apparent from the following detailed description, which proceeds with reference to the accompanying figures.

BRIEF DESCRIPTION OF THE DRAWINGS

FIG. 4 is a diagram of an example decoder system in conjunction with which some described embodiments can be implemented.

FIG. 7 is a diagram illustrating an example of encoding a block of pixel values using a 1-D dictionary mode.

FIG. 8 is a diagram illustrating an example of decoding a block of pixel values using a 1-D dictionary mode FIG. 9 is a flowchart of an example method for decoding pixel values using a dictionary mode.

FIG. 10 is a flowchart of an example method for decoding pixel values using a 1-D dictionary mode.

DETAILED DESCRIPTION

Figure 1:
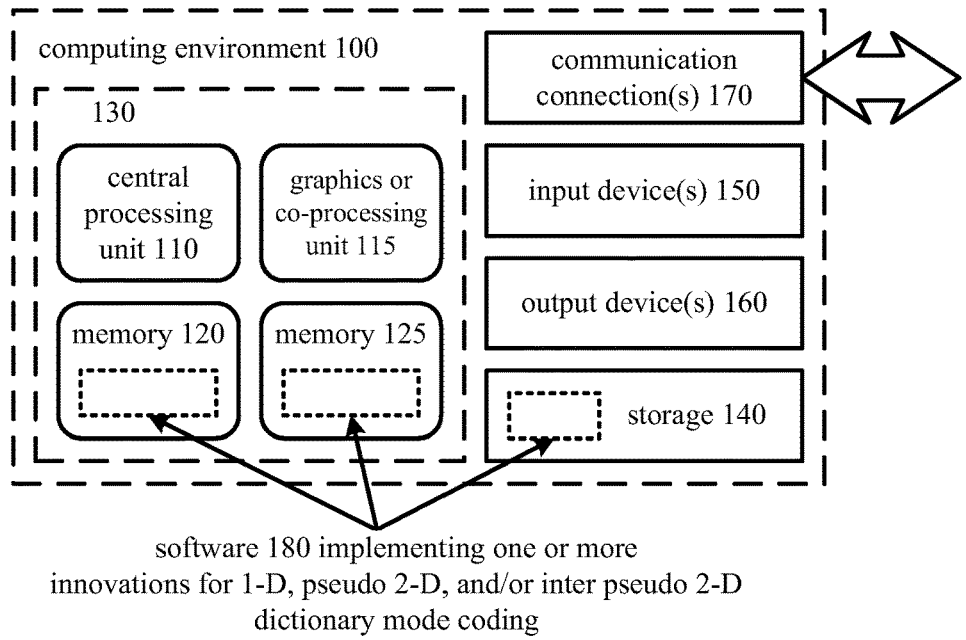
FIG. 1 is a diagram of an example computing system in which some described embodiments can be implemented.

The detailed description presents innovations in the use of dictionary modes during encoding and/or decoding. In particular, the detailed description presents innovations for encoding and/or decoding digital video and/or image content (e.g., video content such as screen content) using 1-D dictionary modes, pseudo 2-D dictionary modes, and/or inter pseudo 2-D dictionary modes. For example, various 1-D, pseudo 2-D, and inter pseudo 2-D dictionary modes can be applied to encode and/or decode pixel values in video content (e.g., in a video picture) based on previously encoded or decoded (e.g., reconstructed) pixel values (e.g., in the video picture) stored in dictionaries (e.g., 1-D dictionaries) or stored in other locations (e.g., stored in a reconstructed picture).

Techniques are described for improving efficiency of encoding and/or decoding of video and/or image data. In some innovations, a dictionary mode is used to encode and/or decode pixel values using previous pixel values (e.g., previously reconstructed or previously decoded pixel values) stored in a dictionary or in another location. In dictionary mode, current pixel values can be predicted (e.g., predicted exactly, without requiring any residual) using an offset that identifies a location within previous pixel values (e.g., in a dictionary) and a length indicating a number of pixel values being predicted. Lossless prediction can be performed by predicting pixel values exactly from previous pixel values.

Some of these innovations improve efficiency of encoding and/or decoding digital picture content (e.g., image content and/or video content). For example, a dictionary coding mode can be applied to reduce the bits needed to code digital picture content. In situations where screen content is being encoded and/or decoded, the various 1-D, pseudo 2-D, and inter pseudo 2-D dictionary coding modes can be applied to reduce the coding complexity and/or the number of bits needed to code the content. In other innovations encoding of digital picture content can be improved by calculating hash values of various groupings of pixels (e.g., 1 pixel, 2 pixels, 4 pixels, 8 pixels, and so on) and matching hash values to identify matching pixel values to use for predicting current pixel values being encoded (e.g., for encoding using the various dictionary modes described herein).

The technologies described herein can be applied to coding of screen content. Screen content refers to video and/or image content that is computer-generated (e.g., text, graphics, and/or other artificial content that is computer-generated). An example of screen content is an image of a computer desktop graphical user interface comprising text, icons, menus, windows, and/or other computer text and graphics. The technologies described herein can also be applied to content other than screen content (e.g., other types of digital video and/or image content).

Although operations described herein are in places described as being performed by a video encoder or video decoder, in many cases the operations can be performed by another type of media processing tool (e.g., digital image or digital picture encoder, digital image or digital picture decoder).

Some of the innovations described herein are illustrated with reference to syntax elements and operations specific to the HEVC standard. For example, reference is made to the draft version JCTVC-N1005 of the HEVC standard—"High Efficiency Video Coding (HEVC) Range Extensions Text Specification: Draft 4," JCTVC-N1005, July 2013. The innovations described herein can also be implemented for other standards or formats.

More generally, various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Different embodiments use one or more of the described innovations. Some of the innovations described herein address one or more of the problems noted in the background. Typically, a given technique/tool does not solve all such problems.

I. Example Computing Systems

FIG. 1 illustrates a generalized example of a suitable computing system (100) in which several of the described innovations may be implemented. The computing system (100) is not intended to suggest any limitation as to scope of use or functionality, as the innovations may be implemented in diverse general-purpose or special-purpose computing systems.

With reference to FIG. 1, the computing system (100) includes one or more processing units (110, 115) and memory (120, 125). The processing units (110, 115) execute computer-executable instructions. A processing unit can be a general-purpose central processing unit ("CPU"), processor in an application-specific integrated circuit ("ASIC") or any other type of processor. In a multi-processing system, multiple processing units execute computer-executable instructions to increase processing power. For example, FIG. 1 shows a central processing unit (110) as well as a graphics processing unit or co-processing unit (115). The tangible memory (120, 125) may be volatile memory (e.g., registers, cache, RAM), non-volatile memory (e.g., ROM, EEPROM, flash memory, etc.), or some combination of the two, accessible by the processing unit(s). The memory (120, 125) stores software (180) implementing one or more innovations for 1-D, pseudo 2-D, and/or inter pseudo 2-D dictionary mode coding, in the form of computer-executable instructions suitable for execution by the processing unit(s).

A computing system may have additional features. For example, the computing system (100) includes storage (140), one or more input devices (150), one or more output devices (160), and one or more communication connections (170). An interconnection mechanism (not shown) such as a bus, controller, or network interconnects the components of the computing system (100). Typically, operating system software (not shown) provides an operating environment for other software executing in the computing system (100), and coordinates activities of the components of the computing system (100).

The tangible storage (140) may be removable or non-removable, and includes magnetic disks, magnetic tapes or cassettes, CD-ROMs, DVDs, or any other medium which can be used to store information and which can be accessed within the computing system (100). The storage (140) stores instructions for the software (180) implementing one or more innovations for 1-D, pseudo 2-D, and/or inter pseudo 2-D dictionary mode coding.

The input device(s) (150) may be a touch input device such as a keyboard, mouse, pen, or trackball, a voice input device, a scanning device, or another device that provides input to the computing system (100). For video, the input device(s) (150) may be a camera, video card, TV tuner card, or similar device that accepts video input in analog or digital form, or a CD-ROM or CD-RW that reads video samples into the computing system (100). The output device(s) (160) may be a display, printer, speaker, CD-writer, or another device that provides output from the computing system (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Any of the disclosed innovations can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 1, computer-readable storage media include memory 1020 and 1025, and storage 1040. The term computer-readable storage media does not include signals and carrier waves. In addition, the term computer-readable storage media does not include communication connections (e.g., 170).

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

The disclosed methods can also be implemented using specialized computing hardware configured to perform any of the disclosed methods. For example, the disclosed methods can be implemented by an integrated circuit (e.g., an ASIC (such as an ASIC digital signal process unit ("DSP"), a graphics processing unit ("GPU"), or a programmable logic device ("PLD"), such as a field programmable gate array ("FPGA")) specially designed or configured to implement any of the disclosed methods.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

II. Example Network Environments

Figure 2A:
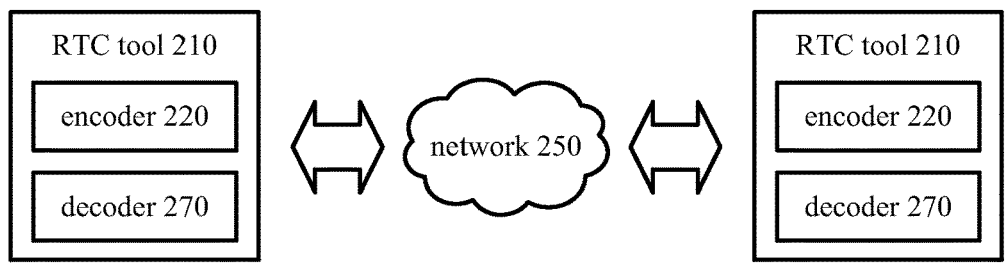
FIGS. 2a and 2b are diagrams of example network environments in which some described embodiments can be implemented.
Figure 2B:
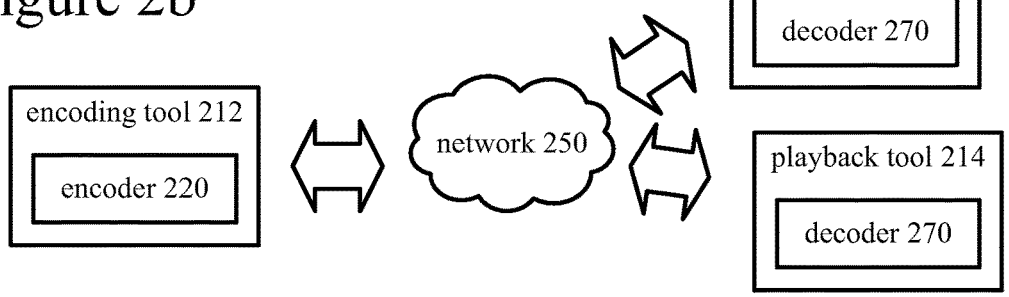

FIGS. 2a and 2b show example network environments (201, 202) that include video encoders (220) and video decoders (270). The encoders (220) and decoders (270) are connected over a network (250) using an appropriate communication protocol. The network (250) can include the Internet or another computer network.

In the network environment (201) shown in FIG. 2a, each real-time communication ("RTC") tool (210) includes both an encoder (220) and a decoder (270) for bidirectional communication. A given encoder (220) can produce output compliant with a variation or extension of the HEVC standard, SMPTE 421M standard, ISO-IEC 14496-10 standard (also known as H.264 or AVC), another standard, or a proprietary format, with a corresponding decoder (270) accepting encoded data from the encoder (220). The bidirectional communication can be part of a video conference, video telephone call, or other two-party communication scenario. Although the network environment (201) in FIG. 2a includes two real-time communication tools (210), the network environment (201) can instead include three or more real-time communication tools (210) that participate in multi-party communication.

Figure 3:
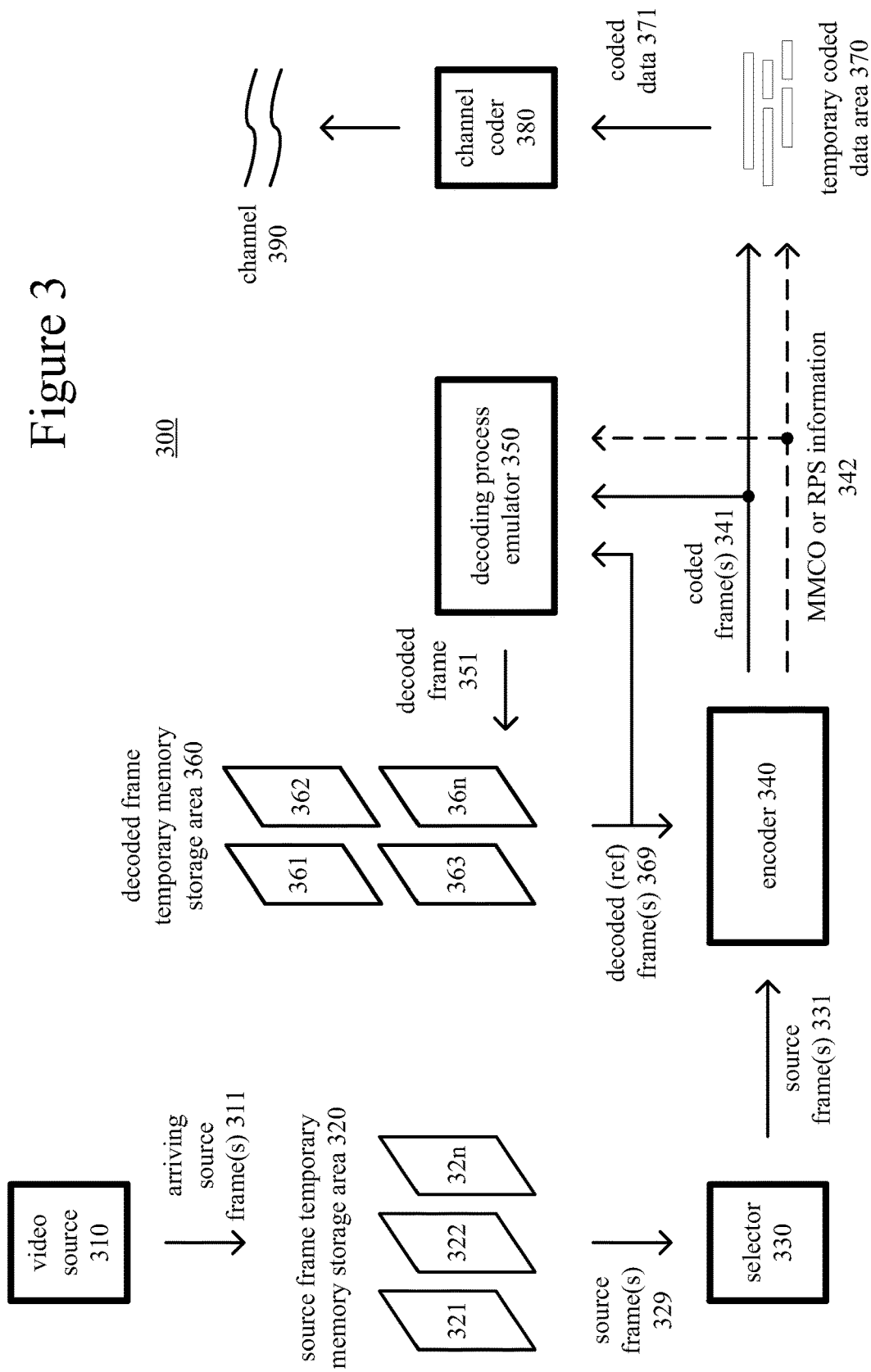
FIG. 3 is a diagram of an example encoder system in conjunction with which some described embodiments can be implemented.

A real-time communication tool (210) manages encoding by an encoder (220). FIG. 3 shows an example encoder system (300) that can be included in the real-time communication tool (210). Alternatively, the real-time communication tool (210) uses another encoder system. A real-time communication tool (210) also manages decoding by a decoder (270). FIG. 4 shows an example decoder system (400), which can be included in the real-time communication tool (210). Alternatively, the real-time communication tool (210) uses another decoder system.

In the network environment (202) shown in FIG. 2b, an encoding tool (212) includes an encoder (220) that encodes video for delivery to multiple playback tools (214), which include decoders (270). The unidirectional communication can be provided for a video surveillance system, web camera monitoring system, remote desktop conferencing presentation or other scenario in which video is encoded and sent from one location to one or more other locations. Although the network environment (202) in FIG. 2b includes two playback tools (214), the network environment (202) can include more or fewer playback tools (214). In general, a playback tool (214) communicates with the encoding tool (212) to determine a stream of video for the playback tool (214) to receive. The playback tool (214) receives the stream, buffers the received encoded data for an appropriate period, and begins decoding and playback.

FIG. 3 shows an example encoder system (300) that can be included in the encoding tool (212). Alternatively, the encoding tool (212) uses another encoder system. The encoding tool (212) can also include server-side controller logic for managing connections with one or more playback tools (214). FIG. 4 shows an example decoder system (400), which can be included in the playback tool (214). Alternatively, the playback tool (214) uses another decoder system. A playback tool (214) can also include client-side controller logic for managing connections with the encoding tool (212).

III. Example Encoder Systems

FIG. 3 is a block diagram of an example encoder system (300) in conjunction with which some described embodiments may be implemented. The encoder system (300) can be a general-purpose encoding tool capable of operating in any of multiple encoding modes such as a low-latency encoding mode for real-time communication, transcoding mode, and regular encoding mode for media playback from a file or stream, or it can be a special-purpose encoding tool adapted for one such encoding mode. The encoder system (300) can be implemented as an operating system module, as part of an application library or as a standalone application.

Overall, the encoder system (300) receives a sequence of source video frames (311) from a video source (310) and produces encoded data as output to a channel (390). The encoded data output to the channel can include content encoded using 1-D, pseudo 2-D, and/or inter pseudo 2-D dictionary modes.

The video source (310) can be a camera, tuner card, storage media, or other digital video source. The video source (310) produces a sequence of video frames at a frame rate of, for example, 30 frames per second. As used herein, the term "frame" generally refers to source, coded or reconstructed image data. For progressive video, a frame is a progressive video frame. For interlaced video, in example embodiments, an interlaced video frame is de-interlaced prior to encoding. Alternatively, two complementary interlaced video fields are encoded as an interlaced video frame or separate fields. Aside from indicating a progressive video frame, the term "frame" or "picture" can indicate a single non-paired video field, a complementary pair of video fields, a video object plane that represents a video object at a given time, or a region of interest in a larger image. The video object plane or region can be part of a larger image that includes multiple objects or regions of a scene.

An arriving source frame (311) is stored in a source frame temporary memory storage area (320) that includes multiple frame buffer storage areas (321, 322, . . . , 32n). A frame buffer (321, 322, etc.) holds one source frame in the source frame storage area (320). After one or more of the source frames (311) have been stored in frame buffers (321, 322, etc.), a frame selector (330) periodically selects an individual source frame from the source frame storage area (320). The order in which frames are selected by the frame selector (330) for input to the encoder (340) may differ from the order in which the frames are produced by the video source (310), e.g., a frame may be ahead in order, to facilitate temporally backward prediction. Before the encoder (340), the encoder system (300) can include a pre-processor (not shown) that performs pre-processing (e.g., filtering) of the selected frame (331) before encoding. The pre-processing can also include color space conversion into primary and secondary components for encoding. Typically, before encoding, video has been converted to a color space such as YUV, in which sample values of a luma (Y) component represent brightness or intensity values, and sample values of chroma (U, V) components represent color-difference values. The chroma sample values may be sub-sampled to a lower chroma sampling rate (e.g., for YUV 4:2:0 format), or the chroma sample values may have the same resolution as the luma sample values (e.g., for YUV 4:4:4 format). Or, the video can be encoded in another format (e.g., RGB 4:4:4 format).

The encoder (340) encodes the selected frame (331) to produce a coded frame (341) and also produces memory management control operation ("MMCO") signals (342) or reference picture set ("RPS") information. If the current frame is not the first frame that has been encoded, when performing its encoding process, the encoder (340) may use one or more previously encoded/decoded frames (369) that have been stored in a decoded frame temporary memory storage area (360). Such stored decoded frames (369) are used as reference frames for inter-frame prediction of the content of the current source frame (331). Generally, the encoder (340) includes multiple encoding modules that perform encoding tasks such as partitioning into tiles, intra prediction estimation and prediction, motion estimation and compensation, frequency transforms, quantization and entropy coding. The exact operations performed by the encoder (340) can vary depending on compression format. The format of the output encoded data can be a variation or extension of HEVC format, Windows Media Video format, VC-1 format, MPEG-x format (e.g., MPEG-1, MPEG-2, or MPEG-4), H.26x format (e.g., H.261, H.262, H.263, H.264), or another format.

The encoder (340) can partition a frame into multiple tiles of the same size or different sizes. For example, the encoder (340) splits the frame along tile rows and tile columns that, with frame boundaries, define horizontal and vertical boundaries of tiles within the frame, where each tile is a rectangular region. Tiles are often used to improve options for parallel processing. A frame can also be organized as one or more slices, where a slice can be an entire frame or region of the frame. A slice can be decoded independently of other slices in a frame, which improves error resilience. The content of a slice or tile is further partitioned into blocks or other sets of samples for purposes of encoding and decoding.

For syntax according to the HEVC standard, the encoder splits the content of a frame (or slice or tile) into coding tree units. A coding tree unit ("CTU") includes luma sample values organized as a luma coding tree block ("CTB") and corresponding chroma sample values organized as two chroma CTBs. The size of a CTU (and its CTBs) is selected by the encoder, and can be, for example, 64×64, 32×32 or 16×16 sample values. A CTU includes one or more coding units. A coding unit ("CU") has a luma coding block ("CB") and two corresponding chroma CBs. For example, a CTU with a 64×64 luma CTB and two 64×64 chroma CTBs (YUV 4:4:4 format) can be split into four CUs, with each CU including a 32×32 luma CB and two 32×32 chroma CBs, and with each CU possibly being split further into smaller CUs. Or, as another example, a CTU with a 64×64 luma CTB and two 32×32 chroma CTBs (YUV 4:2:0 format) can be split into four CUs, with each CU including a 32×32 luma CB and two 16×16 chroma CBs, and with each CU possibly being split further into smaller CUs. The smallest allowable size of CU (e.g., 8×8, 16×16) can be signaled in the bitstream.

Generally, a CU has a prediction mode such as inter or intra. A CU includes one or more prediction units for purposes of signaling of prediction information (such as prediction mode details, etc.) and/or prediction processing. A prediction unit ("PU") has a luma prediction block ("PB") and two chroma PBs. For an intra-predicted CU, the PU has the same size as the CU, unless the CU has the smallest size (e.g., 8×8). In that case, the CU can be split into four smaller PUs (e.g., each 4×4 if the smallest CU size is 8×8) or the PU can have the smallest CU size, as indicated by a syntax element for the CU. A CU also has one or more transform units for purposes of residual coding/decoding, where a transform unit ("TU") has a transform block ("TB") and two chroma TBs. A PU in an intra-predicted CU may contain a single TU (equal in size to the PU) or multiple TUs. As used herein, the term "block" can indicate a CU, CB, PB, TB or other set of sample values, depending on context. The encoder decides how to partition video into CTUs, CUs, PUs, TUs, etc.

Returning to FIG. 3, the encoder represents an intra-coded block of a source frame (331) in terms of prediction from other, previously reconstructed sample values in the frame (331). For intra spatial prediction for a block, the intra-picture estimator estimates extrapolation of the neighboring reconstructed sample values into the block. The intra-prediction estimator outputs prediction information (such as prediction mode (direction) for intra spatial prediction), which is entropy coded. An intra-prediction predictor applies the prediction information to determine intra prediction values.

For the various dictionary coding modes described herein, the encoder can calculate hash values of previously reconstructed sample values (e.g., groupings of 1 pixel, 2 pixels, 4 pixels, 8 pixels, and so on) and compare those has values for a hash value of a current pixel value being encoded. Matches of length one or more can be identified in the previously reconstructed sample values based on the hash comparison and the current pixel value (or values) can be encoded using the various 1-D and pseudo 2-D dictionary modes described herein (or the inter pseudo 2-D dictionary mode with reference to a reference picture).

The encoder (340) represents an inter-coded, predicted block of a source frame (331) in terms of prediction from reference frames. A motion estimator estimates motion of the block with respect to one or more reference frames (369). When multiple reference frames are used, the multiple reference frames can be from different temporal directions or the same temporal direction. A motion-compensated prediction reference region is a region of samples in the reference frame(s) that are used to generate motion-compensated prediction values for a block of samples of a current frame. The motion estimator outputs motion information such as motion vector information, which is entropy coded. A motion compensator applies motion vectors to reference frames (369) to determine motion-compensated prediction values.

The entropy coder of the encoder (340) compresses quantized transform coefficient values as well as certain side information (e.g., motion vector information, QP values, mode decisions, parameter choices). In particular, the entropy coder can compress data for elements of an index map using a coefficient coding syntax structure. Typical entropy coding techniques include Exp-Golomb coding, arithmetic coding, differential coding, Huffman coding, run length coding, variable-length-to-variable-length ("V2V") coding, variable-length-to-fixed-length ("V2F") coding, LZ coding, dictionary coding, probability interval partitioning entropy coding ("PIPE"), and combinations of the above. The entropy coder can use different coding techniques for different kinds of information, and can choose from among multiple code tables within a particular coding technique.

The coded frames (341) and MMCO/RPS information (342) are processed by a decoding process emulator (350). The decoding process emulator (350) implements some of the functionality of a decoder, for example, decoding tasks to reconstruct reference frames. The decoding process emulator (350) uses the MMCO/RPS information (342) to determine whether a given coded frame (341) needs to be reconstructed and stored for use as a reference frame in inter-frame prediction of subsequent frames to be encoded. If the MMCO/RPS information (342) indicates that a coded frame (341) needs to be stored, the decoding process emulator (350) models the decoding process that would be conducted by a decoder that receives the coded frame (341) and produces a corresponding decoded frame (351). In doing so, when the encoder (340) has used decoded frame(s) (369) that have been stored in the decoded frame storage area (360), the decoding process emulator (350) also uses the decoded frame(s) (369) from the storage area (360) as part of the decoding process.

The decoded frame temporary memory storage area (360) includes multiple frame buffer storage areas (361, 362, . . . , 36n). The decoding process emulator (350) uses the MMCO/RPS information (342) to manage the contents of the storage area (360) in order to identify any frame buffers (361, 362, etc.) with frames that are no longer needed by the encoder (340) for use as reference frames. After modeling the decoding process, the decoding process emulator (350) stores a newly decoded frame (351) in a frame buffer (361, 362, etc.) that has been identified in this manner.

The coded frames (341) and MMCO/RPS information (342) are buffered in a temporary coded data area (370). The coded data that is aggregated in the coded data area (370) contains, as part of the syntax of an elementary coded video bitstream, encoded data for one or more pictures. The coded data that is aggregated in the coded data area (370) can also include media metadata relating to the coded video data (e.g., as one or more parameters in one or more supplemental enhancement information ("SEI") messages or video usability information ("VUI") messages).

The aggregated data (371) from the temporary coded data area (370) are processed by a channel encoder (380). The channel encoder (380) can packetize the aggregated data for transmission as a media stream (e.g., according to a media stream multiplexing format such as ISO/IEC 13818-1), in which case the channel encoder (380) can add syntax elements as part of the syntax of the media transmission stream. Or, the channel encoder (380) can organize the aggregated data for storage as a file (e.g., according to a media container format such as ISO/IEC 14496-12), in which case the channel encoder (380) can add syntax elements as part of the syntax of the media storage file. Or, more generally, the channel encoder (380) can implement one or more media system multiplexing protocols or transport protocols, in which case the channel encoder (380) can add syntax elements as part of the syntax of the protocol(s). The channel encoder (380) provides output to a channel (390), which represents storage, a communications connection, or another channel for the output.

IV. Example Decoder Systems

FIG. 4 is a block diagram of an example decoder system (400) in conjunction with which some described embodiments may be implemented. The decoder system (400) can be a general-purpose decoding tool capable of operating in any of multiple decoding modes such as a low-latency decoding mode for real-time communication and regular decoding mode for media playback from a file or stream, or it can be a special-purpose decoding tool adapted for one such decoding mode. The decoder system (400) can be implemented as an operating system module, as part of an application library or as a standalone application. Overall, the decoder system (400) receives coded data from a channel (410) and produces reconstructed frames as output for an output destination (490). The coded data can include content encoded using 1-D, pseudo 2-D, and/or inter pseudo 2-D dictionary modes.

The decoder system (400) includes a channel (410), which can represent storage, a communications connection, or another channel for coded data as input. The channel (410) produces coded data that has been channel coded. A channel decoder (420) can process the coded data. For example, the channel decoder (420) de-packetizes data that has been aggregated for transmission as a media stream (e.g., according to a media stream multiplexing format such as ISO/IEC 13818-1), in which case the channel decoder (420) can parse syntax elements added as part of the syntax of the media transmission stream. Or, the channel decoder (420) separates coded video data that has been aggregated for storage as a file (e.g., according to a media container format such as ISO/IEC 14496-12), in which case the channel decoder (420) can parse syntax elements added as part of the syntax of the media storage file. Or, more generally, the channel decoder (420) can implement one or more media system demultiplexing protocols or transport protocols, in which case the channel decoder (420) can parse syntax elements added as part of the syntax of the protocol(s).

The coded data (421) that is output from the channel decoder (420) is stored in a temporary coded data area (430) until a sufficient quantity of such data has been received. The coded data (421) includes coded frames (431) and MMCO/RPS information (432). The coded data (421) in the coded data area (430) contain, as part of the syntax of an elementary coded video bitstream, coded data for one or more pictures. The coded data (421) in the coded data area (430) can also include media metadata relating to the encoded video data (e.g., as one or more parameters in one or more SEI messages or VUI messages).

In general, the coded data area (430) temporarily stores coded data (421) until such coded data (421) is used by the decoder (450). At that point, coded data for a coded frame (431) and MMCO/RPS information (432) are transferred from the coded data area (430) to the decoder (450). As decoding continues, new coded data is added to the coded data area (430) and the oldest coded data remaining in the coded data area (430) is transferred to the decoder (450).

The decoder (450) periodically decodes a coded frame (431) to produce a corresponding decoded frame (451). As appropriate, when performing its decoding process, the decoder (450) may use one or more previously decoded frames (469) as reference frames for inter-frame prediction. The decoder (450) reads such previously decoded frames (469) from a decoded frame temporary memory storage area (460). Generally, the decoder (450) includes multiple decoding modules that perform decoding tasks such as entropy decoding, inverse quantization, inverse frequency transforms, intra prediction, motion compensation and merging of tiles. The exact operations performed by the decoder (450) can vary depending on compression format.

For example, the decoder (450) receives encoded data for a compressed frame or sequence of frames and produces output including decoded frame (451). In the decoder (450), a buffer receives encoded data for a compressed frame and, at an appropriate time, makes the received encoded data available to an entropy decoder. The entropy decoder entropy decodes entropy-coded quantized data as well as entropy-coded side information, typically applying the inverse of entropy encoding performed in the encoder. A motion compensator applies motion information to one or more reference frames to form motion-compensated prediction values for any inter-coded blocks of the frame being reconstructed. An intra prediction module can spatially predict sample values of a current block from neighboring, previously reconstructed sample values.

For the various dictionary coding modes described herein, the decoder can decode current pixel values in a matching mode and/or a direct mode. In matching mode, the decoder decodes current pixel values that are predicted from previously decoded pixel values (e.g., previously reconstructed pixel values) which may be stored in a 1-D dictionary or in another location (e.g., a reconstructed picture). For example, the decoder can receive one or more codes indicating an offset (e.g., within a dictionary) and a length (indicating a number of pixel values to be predicted from the offset). In direct mode, the decoder can decode pixel values directly without prediction.

In non-dictionary modes, the decoder (450) also reconstructs prediction residuals. An inverse quantizer inverse quantizes entropy-decoded data. For example, the decoder (450) sets values for QP for a picture, tile, slice and/or other portion of video based on syntax elements in the bitstream, and inverse quantizes transform coefficients accordingly. An inverse frequency transformer converts the quantized, frequency domain data into spatial domain information. For an inter-predicted block, the decoder (450) combines reconstructed prediction residuals with motion-compensated predictions. The decoder (450) can similarly combine prediction residuals with predictions from intra prediction. A motion compensation loop in the video decoder (450) includes an adaptive de-blocking filter to smooth discontinuities across block boundary rows and/or columns in the decoded frame (451).

The decoded frame temporary memory storage area (460) includes multiple frame buffer storage areas (461, 462, ..., 46n). The decoded frame storage area (460) is an example of a decoded picture buffer. The decoder (450) uses the MMCO/RPS information (432) to identify a frame buffer (461, 462, etc.) in which it can store a decoded frame (451). The decoder (450) stores the decoded frame (451) in that frame buffer.

An output sequencer (480) uses the MMCO/RPS information (432) to identify when the next frame to be produced in output order is available in the decoded frame storage area (460). When the next frame (481) to be produced in output order is available in the decoded frame storage area (460), it is read by the output sequencer (480) and output to the output destination (490) (e.g., display). In general, the order in which frames are output from the decoded frame storage area (460) by the output sequencer (480) may differ from the order in which the frames are decoded by the decoder (450).

V. Example Video Encoders

Figure 5A:
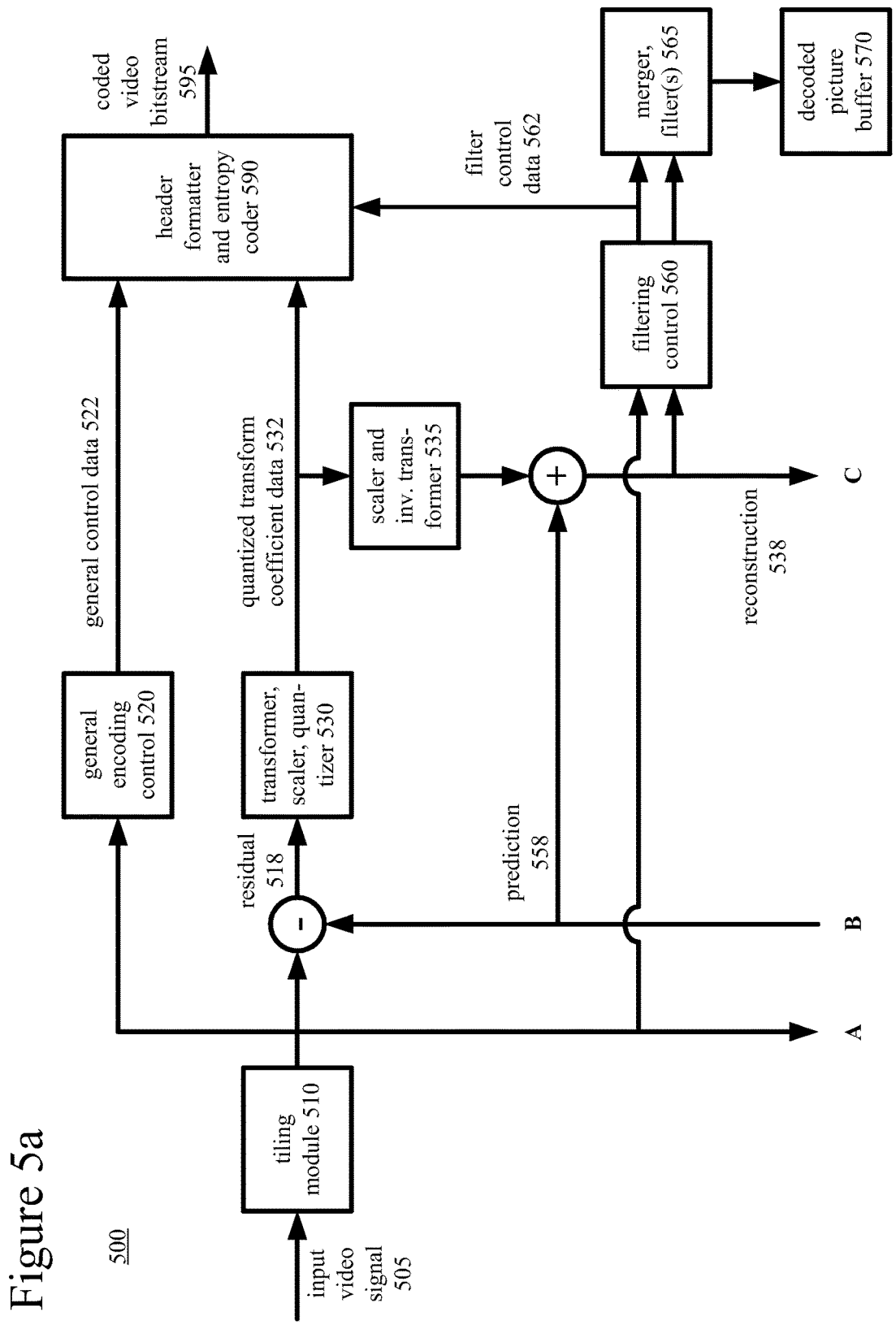
FIGS. 5a and 5b are diagrams illustrating an example video encoder in conjunction with which some described embodiments can be implemented.
Figure 5B:
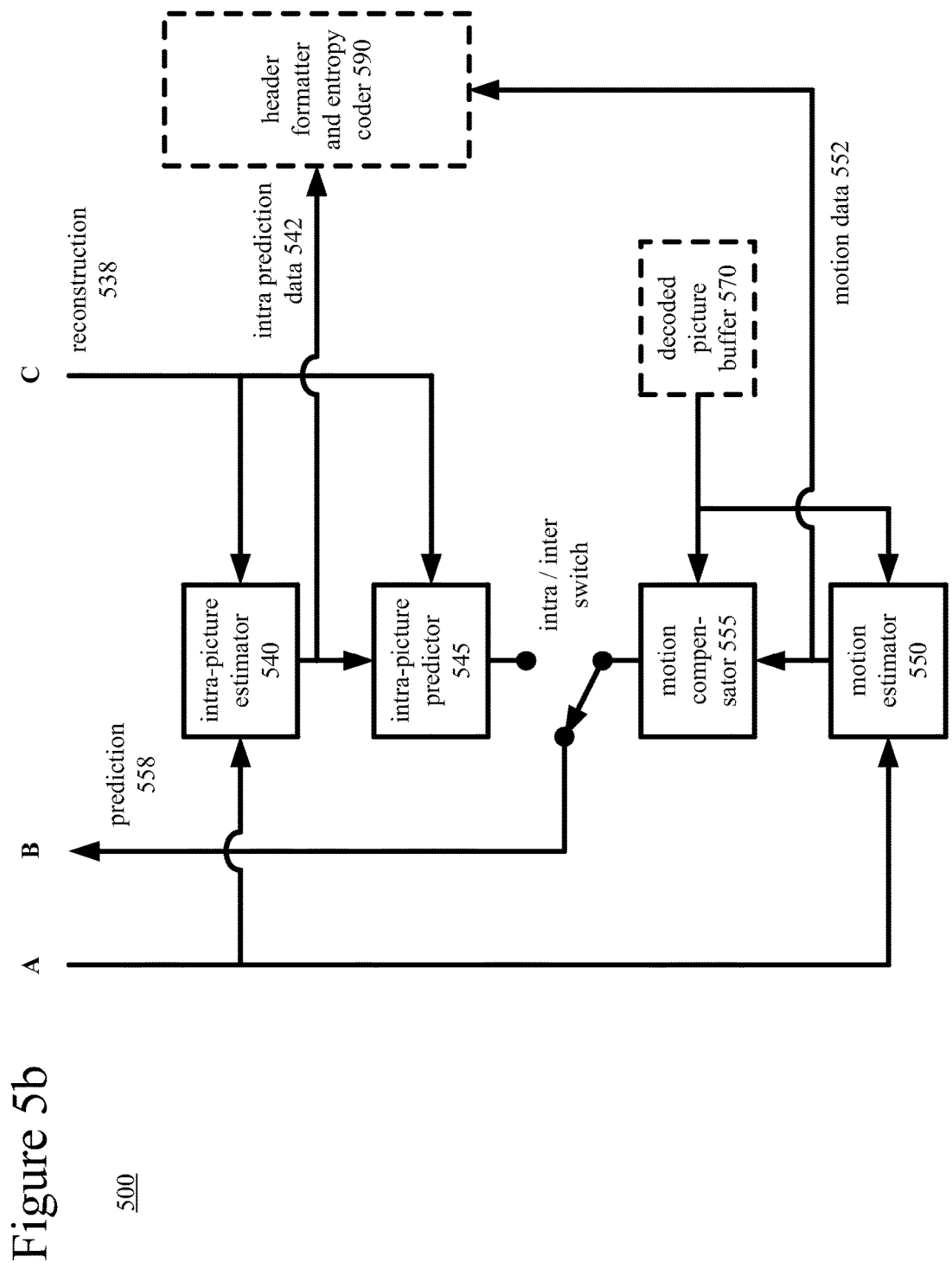

FIGS. 5a and 5b are a block diagram of a generalized video encoder (500) in conjunction with which some described embodiments may be implemented. The encoder (500) receives a sequence of video pictures including a current picture as an input video signal (505) and produces encoded data in a coded video bitstream (595) as output.

The encoder (500) is block-based and uses a block format that depends on implementation. Blocks may be further sub-divided at different stages, e.g., at the prediction, frequency transform and/or entropy encoding stages. For example, a picture can be divided into 64×64 blocks, 32×32 blocks or 16×16 blocks, which can in turn be divided into smaller blocks of sample values for coding and decoding. In implementations of encoding for the HEVC standard, the encoder partitions a picture into CTUs (CTBs), CUs (CBs), PUs (PBs) and TU (TBs).

The encoder (500) compresses pictures using intra-picture coding and/or inter-picture coding. Many of the components of the encoder (500) are used for both intra-picture coding and inter-picture coding. The exact operations performed by those components can vary depending on the type of information being compressed.

A tiling module (510) optionally partitions a picture into multiple tiles of the same size or different sizes. For example, the tiling module (510) splits the picture along tile rows and tile columns that, with picture boundaries, define horizontal and vertical boundaries of tiles within the picture, where each tile is a rectangular region. The tiling module (510) can then group the tiles into one or more tile sets, where a tile set is a group of one or more of the tiles.

The general encoding control (520) receives pictures for the input video signal (505) as well as feedback (not shown) from various modules of the encoder (500). Overall, the general encoding control (520) provides control signals (not shown) to other modules (such as the tiling module (510), transformer/scaler/quantizer (530), scaler/inverse transformer (535), intra-picture estimator (540), motion estimator (550) and intra/inter switch) to set and change coding parameters during encoding. In particular, the general encoding control (520) can decide whether and how to use dictionary modes during encoding. The general encoding control (520) can also evaluate intermediate results during encoding, for example, performing rate-distortion analysis. The general encoding control (520) produces general control data (522) that indicates decisions made during encoding, so that a corresponding decoder can make consistent decisions. The general control data (522) is provided to the header formatter/entropy coder (590).

If the current picture is predicted using inter-picture prediction, a motion estimator (550) estimates motion of blocks of sample values of the current picture of the input video signal (505) with respect to one or more reference pictures. The decoded picture buffer (570) buffers one or more reconstructed previously coded pictures for use as reference pictures. When multiple reference pictures are used, the multiple reference pictures can be from different temporal directions or the same temporal direction. The motion estimator (550) produces as side information motion data (552) such as motion vector data and reference picture selection data. The motion data (552) is provided to the header formatter/entropy coder (590) as well as the motion compensator (555).

The motion compensator (555) applies motion vectors to the reconstructed reference picture(s) from the decoded picture buffer (570). The motion compensator (555) produces motion-compensated predictions for the current picture.

In a separate path within the encoder (500), an intra-picture estimator (540) determines how to perform intra-picture prediction for blocks of sample values of a current picture of the input video signal (505). The current picture can be entirely or partially coded using intra-picture coding. Using values of a reconstruction (538) of the current picture, for intra spatial prediction, the intra-picture estimator (540) determines how to spatially predict sample values of a current block of the current picture from neighboring, previously reconstructed sample values of the current picture.

For the various dictionary coding modes described herein, the encoder (500) can calculate hash values of previously reconstructed sample values (e.g., groupings of 1 pixel, 2 pixels, 4 pixels, 8 pixels, and so on) and compare those has values for a hash value of a current pixel value being encoded. Matches of length one or more can be identified in the previously reconstructed sample values based on the hash comparison and the current pixel value (or values) can be encoded using the various 1-D and pseudo 2-D dictionary modes described herein (or the inter pseudo 2-D dictionary mode with reference to a reference picture).

The intra-prediction estimator (540) produces as side information intra prediction data (542), such as information indicating whether intra prediction uses spatial prediction or one of the various dictionary modes (e.g., a flag value per intra block or per intra block of certain prediction mode directions), prediction mode direction (for intra spatial prediction). The intra prediction data (542) is provided to the header formatter/entropy coder (590) as well as the intra-picture predictor (545). According to the intra prediction data (542), the intra-picture predictor (545) spatially predicts sample values of a current block of the current picture from neighboring, previously reconstructed sample values of the current picture.

In non-dictionary modes, the intra/inter switch selects values of a motion-compensated prediction or intra-picture prediction for use as the prediction (558) for a given block. In non-dictionary modes, the difference (if any) between a block of the prediction (558) and corresponding part of the original current picture of the input video signal (505) provides values of the residual (518). During reconstruction of the current picture, reconstructed residual values are combined with the prediction (558) to produce a reconstruction (538) of the original content from the video signal (505). In lossy compression, however, some information is still lost from the video signal (505).

In the transformer/scaler/quantizer (530), for non-dictionary modes, a frequency transformer converts spatial domain video information into frequency domain (i.e., spectral, transform) data. For block-based video coding, the frequency transformer applies a discrete cosine transform ("DCT"), an integer approximation thereof, or another type of forward block transform to blocks of prediction residual data (or sample value data if the prediction (558) is null), producing blocks of frequency transform coefficients. The encoder (500) may also be able to indicate that such transform step is skipped. The scaler/quantizer scales and quantizes the transform coefficients. For example, the quantizer applies non-uniform, scalar quantization to the frequency domain data with a step size that varies on a frame-by-frame basis, tile-by-tile basis, slice-by-slice basis, block-by-block basis or other basis. The quantized transform coefficient data (532) is provided to the header formatter/entropy coder (590).

In the scaler/inverse transformer (535), for non-dictionary modes, a scaler/inverse quantizer performs inverse scaling and inverse quantization on the quantized transform coefficients. An inverse frequency transformer performs an inverse frequency transform, producing blocks of reconstructed prediction residuals or sample values. The encoder (500) combines reconstructed residuals with values of the prediction (558) (e.g., motion-compensated prediction values, intra-picture prediction values) to form the reconstruction (538).

For intra-picture prediction, the values of the reconstruction (538) can be fed back to the intra-picture estimator (540) and intra-picture predictor (545). Also, the values of the reconstruction (538) can be used for motion-compensated prediction of subsequent pictures. The values of the reconstruction (538) can be further filtered. A filtering control (560) determines how to perform deblock filtering and sample adaptive offset ("SAO") filtering on values of the reconstruction (538), for a given picture of the video signal (505). The filtering control (560) produces filter control data (562), which is provided to the header formatter/entropy coder (590) and merger/filter(s) (565).

In the merger/filter(s) (565), the encoder (500) merges content from different tiles into a reconstructed version of the picture. The encoder (500) selectively performs deblock filtering and SAO filtering according to the filter control data (562), so as to adaptively smooth discontinuities across boundaries in the frames. Tile boundaries can be selectively filtered or not filtered at all, depending on settings of the encoder (500), and the encoder (500) may provide syntax within the coded bitstream to indicate whether or not such filtering was applied. The decoded picture buffer (570) buffers the reconstructed current picture for use in subsequent motion-compensated prediction.

The header formatter/entropy coder (590) formats and/or entropy codes the general control data (522), quantized transform coefficient data (532), intra prediction data (542)

and packed index values, motion data (552) and filter control data (562). For example, the header formatter/entropy coder (590) uses context-adaptive binary arithmetic coding ("CABAC") for entropy coding of various syntax elements of a coefficient coding syntax structure.

The header formatter/entropy coder (590) provides the encoded data in the coded video bitstream (595). The format of the coded video bitstream (595) can be a variation or extension of HEVC format, Windows Media Video format, VC-1 format, MPEG-x format (e.g., MPEG-1, MPEG-2, or MPEG-4), H.26x format (e.g., H.261, H.262, H.263, H.264), or another format.

Depending on implementation and the type of compression desired, modules of the encoder can be added, omitted, split into multiple modules, combined with other modules, and/or replaced with like modules. In alternative embodiments, encoders with different modules and/or other configurations of modules perform one or more of the described techniques. Specific embodiments of encoders typically use a variation or supplemented version of the encoder (500). The relationships shown between modules within the encoder (500) indicate general flows of information in the encoder; other relationships are not shown for the sake of simplicity.

VI. Example Video Decoders

Figure 6:
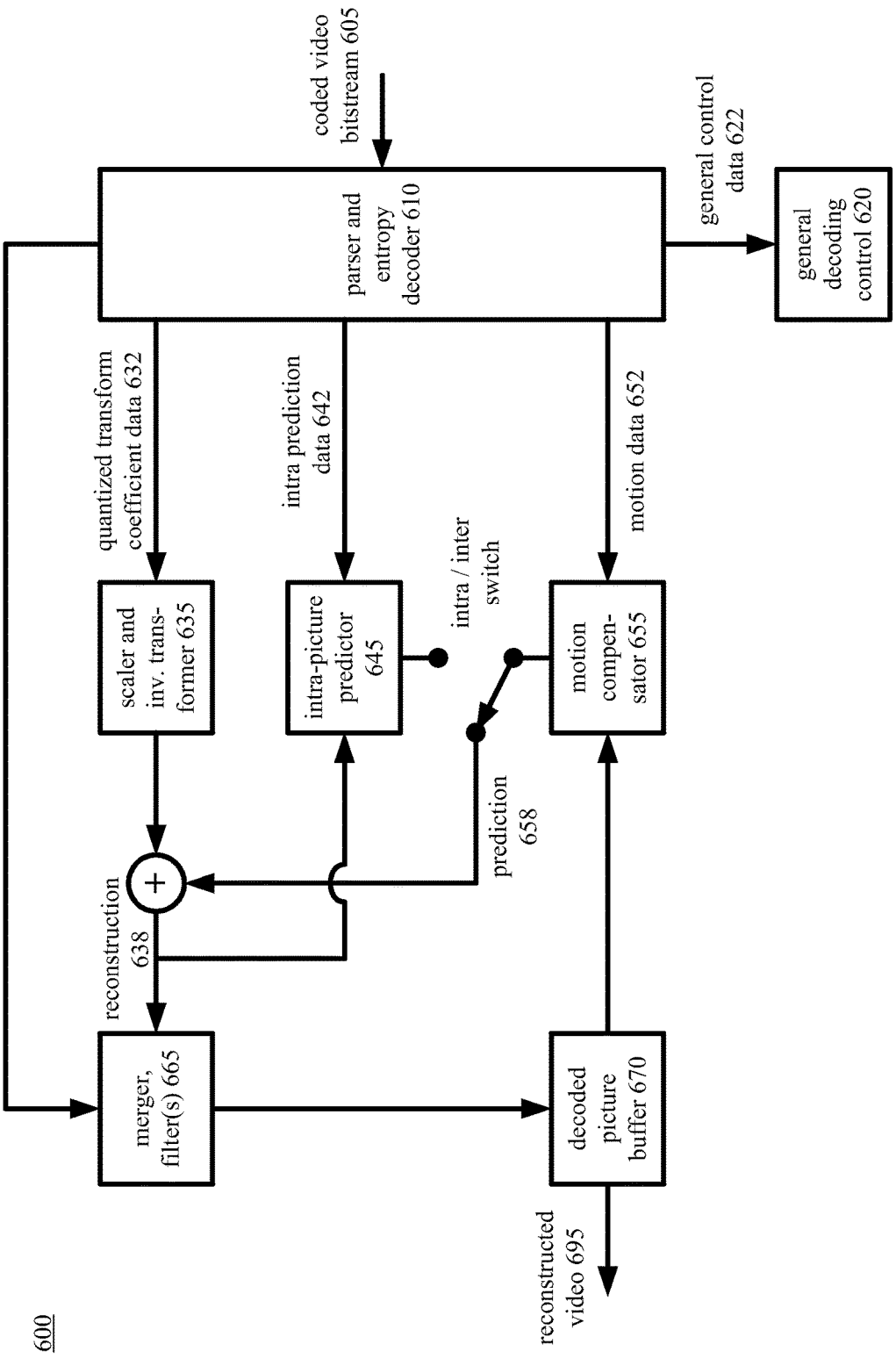
FIG. 6 is a diagram illustrating an example video decoder in conjunction with which some described embodiments can be implemented.

FIG. 6 is a block diagram of a generalized decoder (600) in conjunction with which several described embodiments may be implemented. The decoder (600) receives encoded data in a coded video bitstream (605) and produces output including pictures for reconstructed video (695). The format of the coded video bitstream (605) can be a variation or extension of HEVC format, Windows Media Video format, VC-1 format, MPEG-x format (e.g., MPEG-1, MPEG-2, or MPEG-4), H.26x format (e.g., H.261, H.262, H.263, H.264), or another format.

The decoder (600) is block-based and uses a block format that depends on implementation. Blocks may be further sub-divided at different stages. For example, a picture can be divided into 64×64 blocks, 32×32 blocks or 16×16 blocks, which can in turn be divided into smaller blocks of sample values. In implementations of decoding for the HEVC standard, a picture is partitioned into CTUs (CTBs), CUs (CBs), PUs (PBs) and TU (TBs).

The decoder (600) decompresses pictures using intra-picture decoding and/or inter-picture decoding. Many of the components of the decoder (600) are used for both intra-picture decoding and inter-picture decoding. The exact operations performed by those components can vary depending on the type of information being decompressed.

A buffer receives encoded data in the coded video bitstream (605) and makes the received encoded data available to the parser/entropy decoder (610). The parser/entropy decoder (610) entropy decodes entropy-coded data, typically applying the inverse of entropy coding performed in the encoder (500) (e.g., context-adaptive binary arithmetic decoding). For example, the parser/entropy decoder (610) uses context-adaptive binary arithmetic decoding for entropy decoding of various syntax elements of a coefficient coding syntax structure. As a result of parsing and entropy decoding, the parser/entropy decoder (610) produces general control data (622), quantized transform coefficient data (632), intra prediction data (642) and packed index values, motion data (652) and filter control data (662).

The general decoding control (620) receives the general control data (622) and provides control signals (not shown) to other modules (such as the scaler/inverse transformer (635), intra-picture predictor (645), motion compensator (655) and intra/inter switch) to set and change decoding parameters during decoding.

If the current picture is predicted using inter-picture prediction, a motion compensator (655) receives the motion data (652), such as motion vector data and reference picture selection data. The motion compensator (655) applies motion vectors to the reconstructed reference picture(s) from the decoded picture buffer (670). The motion compensator (655) produces motion-compensated predictions for inter-coded blocks of the current picture. The decoded picture buffer (670) stores one or more previously reconstructed pictures for use as reference pictures.

In a separate path within the decoder (600), the intra-prediction predictor (645) receives the intra prediction data (642), such as information indicating whether intra prediction uses spatial prediction or one of the dictionary modes (e.g., a flag value per intra block or per intra block of certain prediction mode directions), prediction mode direction (for intra spatial prediction). For intra spatial prediction, using values of a reconstruction (638) of the current picture, according to prediction mode data, the intra-picture predictor (645) spatially predicts sample values of a current block of the current picture from neighboring, previously reconstructed sample values of the current picture.

For the various dictionary coding modes described herein, the decoder can decode current pixel values in a matching mode and/or a direct mode. In matching mode, the decoder decodes current pixel values that are predicted from previously decoded pixel values (e.g., previously reconstructed pixel values) which may be stored in a 1-D dictionary or in another location (e.g., a reconstructed picture). For example, the decoder can receive one or more codes indicating an offset (e.g., within a dictionary) and a length (indicating a number of pixel values to be predicted from the offset). In direct mode, the decoder can decode pixel values directly without prediction In non-dictionary modes, the intra/inter switch selects values of a motion-compensated prediction or intra-picture prediction for use as the prediction (658) for a given block. For example, when HEVC syntax is followed, the intra/inter switch can be controlled based on a syntax element encoded for a CU of a picture that can contain intra-predicted CUs and inter-predicted CUs. The decoder (600) combines the prediction (658) with reconstructed residual values to produce the reconstruction (638) of the content from the video signal.

To reconstruct the residual, for non-dictionary modes, the scaler/inverse transformer (635) receives and processes the quantized transform coefficient data (632). In the scaler/inverse transformer (635), a scaler/inverse quantizer performs inverse scaling and inverse quantization on the quantized transform coefficients. An inverse frequency transformer performs an inverse frequency transform, producing blocks of reconstructed prediction residuals or sample values. For example, the inverse frequency transformer applies an inverse block transform to frequency transform coefficients, producing sample value data or prediction residual data. The inverse frequency transform can be an inverse DCT, an integer approximation thereof, or another type of inverse frequency transform.

For intra-picture prediction, the values of the reconstruction (638) can be fed back to the intra-picture predictor (645). For inter-picture prediction, the values of the reconstruction (638) can be further filtered. In the merger/filter(s) (665), the decoder (600) merges content from different tiles into a reconstructed version of the picture. The decoder (600) selectively performs deblock filtering and SAO filtering according to the filter control data (662) and rules for filter adaptation, so as to adaptively smooth discontinuities across boundaries in the frames. Tile boundaries can be selectively filtered or not filtered at all, depending on settings of the decoder (600) or a syntax indication within the encoded bitstream data. The decoded picture buffer (670) buffers the reconstructed current picture for use in subsequent motion-compensated prediction.

The decoder (600) can also include a post-processing deblock filter. The post-processing deblock filter optionally smoothes discontinuities in reconstructed pictures. Other filtering (such as de-ring filtering) can also be applied as part of the post-processing filtering.

Depending on implementation and the type of decompression desired, modules of the decoder can be added, omitted, split into multiple modules, combined with other modules, and/or replaced with like modules. In alternative embodiments, decoders with different modules and/or other configurations of modules perform one or more of the described techniques. Specific embodiments of decoders typically use a variation or supplemented version of the decoder (600). The relationships shown between modules within the decoder (600) indicate general flows of information in the decoder; other relationships are not shown for the sake of simplicity.

VII. Innovations for 1-D Dictionary Mode

This section presents various innovations for one-dimensional (1-D) dictionary mode. Some innovations relate to signaling pixel values using an offset and a length, while others relate to signaling pixel values directly. Still others relate to vertical scanning and horizontal scanning.

In particular, using the 1-D dictionary mode when encoding pixel values can improve performance and reduce needed bits when encoding video content, particularly screen content (e.g., when performing screen capture). Screen content typically includes repeated structures (e.g., graphics, text characters), which provide areas with the same pixel values that can be encoded with prediction to improve performance.

A. 1-D Dictionary Mode—Introduction

In 1-D dictionary mode, sample values (e.g., pixel values) are predicted by reference (using offset and length) to previously sample values stored in a 1-D dictionary (e.g., previously reconstructed sample values). For example, a video encode or image encoder can encode current sample values with reference to a 1-D dictionary storing previous sample values (e.g., reconstructed or original sample values) that are used to predict and encode the current sample values. A video decoder or image decoder can decode current sample values with reference to a 1-D dictionary storing previously decoded (e.g., reconstructed) sample values that are used to predict and decode the current sample values.

In the 1-D dictionary mode, one or more current pixel values can be predicted from one or more previous pixel values (e.g., in scan order). The prediction can be performed by matching the current pixel values with the previous pixel values so that current pixel values can be predicted exactly (e.g., without requiring any residual). The term "matching mode" describes encoding and/or decoding using matching pixel values in a dictionary (or from another source, such as a reconstructed picture). In situations where there are no matching pixel values (e.g., at the beginning of a frame or where there are no matches found in the dictionary of previous pixel values), then one or more current pixel values can be coded directly. The term "direct mode" describes encoding and/or decoding pixel values directly.

In some implementations, pixel values are encoded and decoded as combined pixels (a combination of Y, U, and V values for the pixel, or a combination of R, G, and B values for the pixel, are encoded/decoded together). In other implementations, pixel values are encoded and decoded as separate components (e.g., separate 1-D dictionaries can be maintained for each of Y, U, and V components or R, G, and B components). Pixel values can be encoded and decoded in various YUV data formats (e.g., YUV 4:4:4, YUV 4:2:2, YUV 4:2:0, etc.) or in various RGB data formats (e.g., RGB, GBR, BGR, etc.).

Encoding and/or decoding of pixel values using the 1-D dictionary mode can be applied to video or image content that is divided into distinct areas, such as blocks. Generally, any size block can be used. In some implementations, video content (e.g., a video picture or frame) is divided into coding units with sizes of 64×64, 32×32, 16×16, or 8×8 sample values.

In some implementations, dictionary coding can be combined with other types of coding. For example, pixel values can be coded using one of the dictionary modes described herein (e.g., 1-D dictionary mode). The coded pixel values can then be coded using another coding technique (e.g., context-based arithmetic coding or another coding technique).

B. Signaling Offset and Length

In the 1-D dictionary mode, when there are matching pixel values, the offset and length values are signaled to indicate the position in the 1-D dictionary where the matching pixel values are located to predict the current pixel values. For example, one or more current pixel values can be predicted from one or more previous pixel values stored in the 1-D dictionary that are identified within the 1-D dictionary by offset (the position back in the 1-D dictionary from the current pixel value) and length (the number of pixel values that are predicted from the offset). As should be understood, an offset of 5 means five pixels back in the 1-D dictionary from the current pixel value (e.g., in some implementations a negative sign is added to the offset, which would be an offset of −5 in this example).

In the 1-D dictionary mode, in some implementations pixel values in a current block can be predicted from pixel values in a previous block (e.g., depending on the maximum size of the dictionary). For example, in a picture coded using 64×64 blocks, pixel values from the fourth block in the picture can be predicted (e.g., using offset and length) from pixel values from the first block in the picture that are stored in a 1-D dictionary.

The offset can be encoded and signaled (e.g., in a bit stream) in a format that divides the possible offset values into a number of ranges, and encodes the offset values by range. In this way, an offset can be encoded as a two-part code with the first part identifying the offset range and the second part indicating the offset value within the range.

In a specific implementation, the offset values are coded using the following ranges. In addition, in this implementation zero-based numbering is applied so that offset values are decreased by 1 before the offset values are encoded and increased by 1 after the offset values are decoded. The ranges (with their offset range codes), corresponding offset values, and number of bits are indicated by the following table (Table 1).

TABLE 1

Example Ranges for Offset Values

| Range | Offset values | Number of bits to represent offset value |
|---|---|---|
| Range 1 (code: 1) | [0, 3] | 2 bits |
| Range 2 (code: 01) | [4, 19] | 4 bits |
| Range 3 (code: 001) | [20, 275] | 8 bits |
| Range 4 (code: 0001) | [276, 65, 811] | 16 bits |
| Range 5 (code: 0000) | [more than 65, 811] | N bits |

Using the implementation depicted in Table 1 above, offsets can be encoded, signaled, and decoded. As an example, an offset value of 415 (representing an original offset value of 416, which is decreased by 1 for encoding) would be encoded in Range 4. Because Range 4 starts with an offset value of 276, the value to be coded would be 415−276=139. The encoded offset would be generated by combining the offset range code of "0001" (representing Range 4) followed by the 16-bit value of "0000000010001011" (the 16-bit binary value for the decimal number 139). Putting the two parts of the code together (the offset range code and the offset value code) results in the following combined code for the encoded offset: "00010000000010001011". As another example, an offset value of 45 (representing an original offset value of 46, which is decreased by 1 for encoding) would be encoded in Range 3. Because Range 3 starts with an offset value of 20, the value to be coded would be 45−20=25. The encoded offset would be generated by combining the offset range code of "001" (representing Range 3) followed by the 8-bit value of "00011001" (the 8-bit binary value for the decimal number 25). Putting the two parts of the code together (the offset range code and the offset value code) results in the following combined code for the encoded offset: "00100011001".

As depicted in Table 1 above, Range 5 represents offset values of more than 65,811 using N bits where N represents the number of bits needed to represent the maximum offset value. In some implementations, the maximum offset value is determined from the current dictionary size. For example, if the current dictionary size is 300,000, then N can be set to 18 (i.e., 18 bits are needed to represent the maximum offset value of 300,000), and therefore an offset value between 65,811 and 300,000 would use 18 bits to encode the offset value. It should be understood that the offset value for Range 5 begins at 65,812, so to represent 300,000 only 18 bits are needed to represent the amount over 65,811 (i.e., only 18 bits are needed to represent 300,000−65,812=234,188). In other implementations, the maximum offset value is pre-determined and does not depend on the current dictionary size. For example, if the pre-determined maximum offset value is 800,000, then N can be set to 20.

In other implementations, the offset values can be coded using a different number of ranges and/or ranges covering different groupings of offset values.

In a specific implementation, the length values are coded by range, similar to the offset values. In addition, in this implementation zero-based numbering is applied so that length values are decreased by 1 before the length values are encoded and increased by 1 after the length values are decoded. The ranges (with their length range codes), corresponding length values, and number of bits are indicated by the following table (Table 2).

TABLE 2

Example Ranges for Length Values

| Range | Length values | Number of bits to represent length value |
|---|---|---|
| Range 1 (code: 1) | [0, 3] | 2 bits |
| Range 2 (code: 01) | [4, 19] | 4 bits |
| Range 3 (code: 001) | [20, 275] | 8 bits |
| Range 4 (code: 000) | [more than 275] | N bits |

Using the implementation depicted in Table 2 above, lengths can be encoded, signaled, and decoded. As an example, a length value of 2 (representing an original length value of 3, which is decreased by 1 for encoding) would be encoded in Range 1. The encoded length would be generated by combining the length range code of "1" (representing Range 1) followed by the 2-bit value of "10" (the 2-bit binary value for the decimal number 2). Putting the two parts of the code together (the length range code and the length value code) results in the following combined code for the encoded length: "101". As another example, a length value of 56 (representing an original length value of 57, which is decreased by 1 for encoding) would be encoded in Range 3. Because Range 3 starts with an offset value of 20, the value to be coded would be 56−20=36. The encoded length would be generated by combining the length range code of "001" (representing Range 3) followed by the 8-bit value of "00100100" (the 8-bit binary value for the decimal number 36). Putting the two parts of the code together (the length range code and the length value code) results in the following combined code for the encoded length: "00100100100".

As depicted in Table 2 above, Range 4 represents length values of more than 275 using N bits where N represents the number of bits needed to represent the maximum length value. In some implementations, the maximum length value is the number of pixels left in the current block being encoded or decoded. For example, if the current pixel value being encoded or decoded is the $3,000^{th}$ pixel value in a current 64×64 block (a block having 4,096 pixel values), then the maximum length value is 1,096 (4,096−3,000), which can be represented by 10 bits (N=10). It should be understood that the offset value for Range 4 begins at 276, so to represent 1,096 only 10 bits are needed to represent the amount over 275 (i.e., only 10 bits are needed to represent 1,096−276=820). In other implementations, the maximum length value is pre-determined and does not depend on the current dictionary size. For example, if the pre-determined maximum length value is 4,096, then N can be set to 12.

In other implementations, the length values can be coded using a different number of ranges and/or ranges covering different groupings of length values.

In some implementations, a maximum offset and/or a maximum length is known. When the maximum offset and/or maximum length is known, coding efficiency can be improved. For example, when coding the value of the matching offset, the maximum offset can be set to the current dictionary size (e.g., if the current dictionary size is 10 pixels, the offset cannot be greater than 10). When encoding the value of the matching length, the maximum length can be set to the number of pixels left in the current block (e.g., the current coding unit (CU)). For example, if the current pixel value being encoded or decoded is the $15^{th}$ pixel in an 8×8 block, then the maximum length can be set to 49. When the maximum value is known (for the offset and/or length), it can be signaled more efficiently. For example, the number of bits needed to encode the maximum value can be determined by calculating ceiling(log$_2$(maximum)), which can be used to define the "N" bits in Table 1 and Table 2 above.

In some implementations, the minimum offset and length are 1, which can be coded as 0 when converted to zero-based numbering.

The 1-D dictionary mode can be applied to encode and/or decode pixel values within a block. For example, the 1-D dictionary mode (as well as the other dictionary modes described herein) can be applied to encode and/or decode pixel values within blocks of a video frame (e.g., blocks of various sizes, such as 4×4 blocks, 8×8 blocks, 16×16 blocks, 32×32 blocks, and 64×64 blocks).

In some implementations, the offset and length can overlap the current pixel value being encoded/decoded. As an example, consider pixel values [P−2, P−1, P0, P1, P2, P3] where P−2 and P−1 are the last two pixel values in the 1-D dictionary, P0 is the current pixel value being encoded/decoded, and P1 through P3 are the next pixel values to be encoded/decoded. In this situation, an offset of 1 and a length of 3 (un-encoded offset and length values) is a valid condition in which P0 is predicted from P−1, P1 is predicted from P0, and P2 is predicted from P1. As should be understood, an offset of 1 (un-encoded value, which would be 0 when encoded) means one position back from the current pixel value into the 1-D dictionary (e.g., in some implementations a negative sign is added to the offset, which would be an offset of −1 in this example).

C. Horizontal and Vertical Scanning

The 1-D dictionary mode supports horizontal and vertical scanning, which can be used to convert between the 1-D dictionary and the two dimensional representation of video or image content (e.g., blocks of two dimensional video or image content). For example, pixel values within a block of video content can be scanned horizontally when encoding and decoding. With horizontal scanning, pixel values are added to the 1-D dictionary in horizontal scanning order (e.g., from left to right in a row of pixels). Pixel values within a block of video content can also be scanned vertically when encoding and decoding. With vertical scanning, pixel values are added to the 1-D dictionary in vertical scanning order (e.g., from top to bottom in a column of pixels).

In some implementations, both horizontal and vertical scanning are supported. In order to support both horizontal and vertical scanning, two 1-D dictionaries can be maintained, one 1-D dictionary (a horizontal scanning 1-D dictionary) that stores pixel values in the horizontal scanning order and another 1-D dictionary (a vertical scanning 1-D dictionary) that stores pixel values in the vertical scanning order. When a pixel value needs to be added, it can be added to both the horizontal scanning 1-D dictionary and to the vertical scanning 1-D dictionary. The ordering of the pixel values will be different in both dictionaries as the order depends on which scanning order is used.

In some implementations, adding to the 1-D dictionaries is performed at different times. For example, when encoding or decoding a block in horizontal scanning mode, pixel values can be added to a horizontal scanning 1-D dictionary when they are encoded or decoded. When the current block has been encoded or decoded, the pixel values can then be added to the vertical scanning 1-D dictionary.

In an implementation that supports both horizontal and vertical scanning, the scanning order can be changed (e.g., on a block-by-block basis or on some other basis). For example, if one block of a picture uses horizontal scanning, pixel values for that block will be added to the horizontal scanning 1-D dictionary (in horizontal scanning order), and the pixel values for the block will also be added to the vertical scanning 1-D dictionary (in vertical scanning order). If another block of the picture uses vertical scanning, pixel values for that block will be added to the vertical scanning 1-D dictionary (in vertical scanning order), and the pixel values for the block will also be added to the horizontal scanning 1-D dictionary (in horizontal scanning order).

D. Reducing Dictionary Size

The size of the 1-D dictionary can be limited (e.g., to balance the cost of maintaining the dictionary against the benefit of predicting pixel values). Reducing the size of the dictionary (e.g., pruning the dictionary) can be performed at various times. For example, the size of the dictionary can be checked when adding a pixel value to the dictionary. If the dictionary is larger than a maximum size (e.g., a pre-determined maximum size, such as 500K), the dictionary can be reduced in size (e.g., by removing the oldest entries in the dictionary).

In some implementations, a pre-defined maximum dictionary size is defined. If the dictionary is greater than the pre-defined maximum dictionary size, then a portion of the dictionary is removed (e.g., the oldest portion of the dictionary). In a specific implementation, if the dictionary is greater than the threshold size, then one-third of the dictionary is removed. For example, in some implementation, the basic dictionary size is defined as 1<<18. If the current dictionary size is equal to or greater than 1.5 times basic dictionary size, the oldest 0.5 times basic dictionary size elements are removed from the dictionary.

In some implementations, the dictionary is only checked periodically (and pruned if needed). For example, the dictionary can be checked after encoding and/or decoding a block, a CU, or a CTU. In a specific implementation, the size of the dictionary is checked after encoding or decoding a CTU, and reduced in size by one-third if above the maximum size. In such implementation, it should be guaranteed that the maximum number of elements that may be added to the dictionary between two checks should be no greater than the dictionary buffer size minus the removing threshold. For example, the basic dictionary size is defined as 1<<18, and the removing threshold is defined as 1.5 times basic dictionary size, which should be 1<<18+1<<17. If the dictionary size is checked after encoding or decoding a CTU (suppose the CTU size is 4096), the minimum buffer used for the dictionary should be 1<<18+1<<17+4096.

E. Reconstruction in Scanning Order

After decoding the pixel values, the pixel values are reconstructed to re-create the video content in two dimensions. Reconstructing the pixel values in scanning order can be performed at various points during the decoding process. For example, after the pixel values for a specific area of video content (e.g., a block, a CU, or a CTU) have been decoded, they can be reconstructed in scanning order.

In some implementations, the reconstruction is performed after the pixel values have been decoded for a CU as follows. If horizontal scanning is used for a CU, the following equation (Equation 1) is used to reconstruct the pixel values for the CU with width "w" and height "h" in scanning order (rec[i][j] is the reconstructed pixel at row "i" and column "j"; pixel[ ] are the decoded pixels):

$$rec[i][j]=pixel[i*w+j] \quad \text{(Equation 1)}$$

If vertical scanning is used for a CU, the following equation (Equation 2) is used to reconstruct the pixel values for the CU with width "w" and height "h" in scanning order:

$$rec[i][j]=pixel[j*h+i] \quad \text{(Equation 2)}$$

F. Direct Mode

When using the 1-D dictionary mode, there may be situations where a matching pixel value is not found. For example, during encoding the encoder can look back in the dictionary to determine if there is a pixel value (or a sequence of multiple pixel values) that match the current pixel value being encoded (or that match multiple pixel values currently being encoded). If a match is found, the current pixel value(s) can be encoded in matching mode using the offset and length coding described above in this section. However, if a matching pixel value is not found in the dictionary, then the current pixel value can be encoded using a direct mode. In the direct mode, the current pixel value can be coded directly (e.g., the Y, U, and V components of the pixel value, or R, G, and B components of the pixel value, can be encoded directly without reference to any other pixel value in the dictionary).

In some implementations, an escape code or flag is used to indicate when direct mode is used for a pixel value. For example, an encoder can place the escape code or flag in the bitstream with the directly encoded pixel value so that the decoder knows that the pixel value is encoded using direct mode. In this way, the decoder can distinguish between pixel values encoded in direct mode and pixel values encoded using matching mode. In addition, coding in the 1-D dictionary mode can support switching between matching mode and direct mode as needed (e.g., on a pixel-by-pixel basis).

G. Example Encoding/Decoding

FIG. 7 is a diagram illustrating a simplified example 700 of how pixel values can be encoded using the 1-D dictionary mode. As depicted in the example 700, three rows (the first, second, and last row) of an 8×8 block of example pixel values 710 is depicted. The block of example pixel values 710 are depicted using 3-byte YUV or RGB values. The pixel values in the block are labeled for reference purposes beginning with pixel zero ($P_0$) in horizontal scanning order.

As illustrated in the example 700, the pixel values are encoded using the 1-D dictionary mode 720. The first pixel value $P_0$ is added as the first entry in the 1-D dictionary (e.g., the first pixel value may be the first pixel in the first block of a video frame). Because there are no previous pixel values in the 1-D dictionary, the first pixel value $P_0$ is encoded in direct mode and added to the encoded bit stream. The second pixel value $P_1$ is also added to the 1-D dictionary in direct mode because it does not match any previous pixel values in the dictionary. The third pixel value $P_2$ is also added to the 1-D dictionary in direct mode. The state of the 1-D dictionary and the encoded bit stream are depicted at 730. The encoded bit stream is depicted in a simplified format that indicates the first three pixels are encoded using the direct mode (e.g., the direct mode may be indicated by an escape code in the encoded bit stream).

When the fourth pixel value $P_3$ is encoded, a match is found in the 1-D dictionary. Specifically, $P_0$ matches $P_3$ and therefore $P_3$ can be encoded in the matching mode using an offset value and a length value with reference to $P_0$ in the 1-D dictionary. After the matching pixel $P_0$ is identified in the 1-D dictionary, the length of matching pixel values can be determined. In this example, two pixel values match (i.e., $P_3$ and $P_4$ match $P_0$ and $P_1$). In order to encode the offset and length, this example 700 uses the ranges described above in this section (Table 1 and Table 2). First, the offset and length values are reduced by one (to convert to zero-based numbering) and encoded using the ranges. Specifically, the offset value of 2 (3−1) is encoded according to the first row of Table 1 as "110" (the first "1" indicating Range 1, and the "10" indicating an offset value of 2). The length value of 1 (2−1) is encoded according to the first row of Table 2 as "101" (the first "1" indicating Range 1, and the "01" indicating a length value of 1). Appending the length and offset results in a code of "110101". The state of the 1-D dictionary and the encoded bit stream are depicted at 740. The encoded bit stream is depicted in a simplified format that indicates the first three pixels are encoded using the direct mode and the fourth and fifth pixel values are encoded in matching mode and are predicted from the first and second pixel values.

FIG. 8 is a diagram illustrating a simplified example 800 of how pixel values can be decoded using the 1-D dictionary mode. As depicted in the example 800, the encoded bit stream generated from encoding the block in FIG. 7 is decoded using the 1-D dictionary mode 810. The first three pixel values are decoded in the direct mode and added to the dictionary, as depicted at 820.

The fourth and fifth pixel values are decoded using the matching mode. In this example, the encoded bitstream representation for the fourth and fifth pixel values is "110101," which is decoded using the offset and length ranges defined by Table 1 and Table 2 above in this section. Specifically, the offset is decoded as 2 and the length is decoded as 1. Using the offset and length, the pixel values that are used for the prediction are identified. In this example, the offset of 2 (three pixels back after adding 1 to compensate for the zero-based numbering) identifies the first pixel value in the dictionary. The length indicates that two pixel values are predicted (after adding 1 to the length to compensate for the zero-based numbering). Therefore, the fourth and fifth pixel values are predicted from the first and second pixel values and added to the dictionary, as depicted at 830.

Once the 8×8 block has been decoded, it is reconstructed in horizontal scanning order. The reconstructed 8×8 block is depicted at 840.

VIII. Innovations for Pseudo 2-D Dictionary Mode

This section presents various innovations for the pseudo 2-D dictionary mode. The pseudo 2-D dictionary mode is similar to the 1-D dictionary mode described in Section VII above and therefore the operation of the pseudo 2-D dictionary mode is the same as the 1-D dictionary mode except for the differences described in this section.

While the 1-D dictionary mode maintains a 1-D dictionary of previous pixel values, the pseudo 2-D dictionary mode does not maintain a separate dictionary. Instead, with the pseudo 2-D dictionary mode, all of the previously pixel values can be used for prediction (e.g., all of the previously reconstructed pixel values from the beginning of the picture or frame). For example, a video or image encoder or decoder can ordinarily maintain all reconstructed pixel values (e.g., for the current picture or frame) during encoding and decoding (e.g., for use during prediction).

Because the pseudo 2-D dictionary mode predicts current pixel values from pixel values in a two dimensional picture (e.g., previously reconstructed pixel values), the pseudo 2-D dictionary mode uses a two offset values, an X offset value (offsetX) and a Y offset value (offsetY). The offsetX and offsetY values can be signaled independently using the techniques described above in the 1-D dictionary section (e.g., using the ranges described in Table 1). For example, if a pixel value at 100, 100 (X/Y from the top-left of the current picture) is being predicted from a pixel value at 10, 20, then the offsetX can be set to 90 (indicating 90 pixels left in the reconstructed pixel values for the picture, which can also be indicated by −90) and the offsetY can be set to 80 (indicating 80 pixels up in the reconstructed pixel values for the picture, which can also be indicated by −80).

In the pseudo 2-D dictionary mode, the structure of the block is taken into consideration when performing prediction. For example, consider a current 8×8 block that is coded using horizontal scanning. If a pixel value of the current block is predicted from a previous 8×8 block, and the length of the prediction is 9 (i.e., longer than one row of an 8×8 block), then the pixel values used for prediction in the previous 8×8 block will wrap around two rows of the block (or from the last row of one block to the first row of the next).

In some implementations, the following equation (Equation 3) is used to reconstruct a current pixel in a picture in the pseudo 2-D dictionary mode. In this equation, the dimensions of the current block are width (w)×height (h), the current pixel is the pixel at position "c" (counting from zero) in the current block, (x0, y0) is the start position of the top left of the current block, the offset is (oX, oY), the scanning order is horizontal, the matching length is one, and pictureRec[ ] is the reconstruction of the current picture.

$$\text{pixel}[c] = \text{pictureRec}[y0 - oY + c/w][x0 - oX + c \% w] \quad \text{(Equation 3)}$$

The remaining aspects of the pseudo 2-D dictionary mode are discussed above with regard to the 1-D dictionary mode (e.g., signaling of length, maximum number of bits to code length and offset, support for both horizontal and vertical scanning modes, processing pixel value components together (e.g., Y, U, and V or R, G, and B), etc.).

IX. Innovations for Inter Pseudo 2-D Dictionary Mode

This section presents various innovations for the inter pseudo 2-D dictionary mode. The inter pseudo 2-D dictionary mode is similar to the pseudo 2-D dictionary mode described in Section VIII above and therefore the operation of the inter pseudo 2-D dictionary mode is the same as the pseudo 2-D dictionary mode except for the differences described in this section.

While the pseudo 2-D dictionary model uses the reconstructed pixel values in the current picture for prediction, the inter pseudo 2-D dictionary mode uses the pixels values in a reference picture (or multiple reference pictures) for prediction. In some implementations, the reference picture used for prediction in the inter pseudo 2-D dictionary mode is signaled (e.g., by signaling a reference picture list and a reference picture index into the list). Alternatively, a default reference picture can be used for prediction (e.g., to avoid the signaling overhead for the specific reference picture from multiple available reference pictures). In some implementations, the default reference picture is the first picture in reference picture list 0.

X. Example Methods for Decoding Pixel Values Using a Dictionary Mode

Methods can be provided for decoding pixel values using the 1-D dictionary mode, pseudo 2-D dictionary mode, and/or inter pseudo 2-D dictionary mode.

FIG. 9 is a flowchart of an example method 900 for decoding pixel values using a dictionary mode. At 910, encoded data is received in a bit stream. For example, the encoded data can be encoded video data and/or encoded image data.

At 920, one or more current pixel values are decoded using a dictionary mode. For example, dictionary mode can be a 1-D dictionary mode, a pseudo 2-D dictionary mode, or an inter pseudo 2-D dictionary mode. The one or more current pixel values can be decoded for a block of video content. Decoding the one or more current pixel values comprise performing operations 930 through 950.

At 930, an offset is decoded indicating an offset location within previously decoded pixel values. For example, decoding the offset can comprise decoding an offset range code and an offset value code to obtain an offset value that identifies the offset location within a 1-D dictionary of previously decoded (e.g., previously reconstructed) pixel values in a current picture. Decoding the offset can also comprise decoding a two dimensional offset with X and Y offset values for identifying a previous pixel value using the pseudo 2-D dictionary mode or the inter pseudo 2-D dictionary mode. Furthermore, when using the inter pseudo 2-D dictionary mode, reference picture information can be decoded (e.g., separately from the offset).

At 940, a length is decoded indicating a number of pixels being predicted from the offset that was decoded at 930. For example, decoding the length can comprise decoding a length range code and a length value code.

At 950, the one or more current pixel values are predicted from one or more previous pixel values at the offset. The one or more current pixel values can be predicted exactly using the same pixel values (e.g., YUV or RGB component values) as the one or more previous pixel values without any residual or other modification. The number of pixel values being predicted is indicated by the length.

The one or more current pixel values, after being predicted, can be used for reconstructing a two-dimensional video picture or image (e.g., using a horizontal or vertical scanning order for a current block).

FIG. 10 is a flowchart of an example method 1000 for decoding pixel values using a 1-D dictionary mode. At 1010, encoded data is received in a bit stream. For example, the encoded data can be encoded video data and/or encoded image data.

At 1020, a number of current pixel values are decoded using the 1-D dictionary mode. The 1-D dictionary mode stores previously decoded pixel values (e.g., previously reconstructed pixel values in a current picture) in a 1-D dictionary. Decoding the number of current pixel values comprise performing operations 1030 through 1070.

At 1030, an offset range code is decoded. The offset range code indicates a number of bits for an offset value code. For example, possible offset values can be divided into a number of ranges (e.g., as depicted in Table 1 above), with the offset range code indicating the range and the number of bits used for the offset value code.

At 1040, the offset value code is decoded (using the number of bits indicated at 1030) to produce an offset value. The offset value identifies a location within the 1-D dictionary of previously decoded pixel values. If both a horizontal scanning 1-D dictionary and a vertical scanning 1-D dictionary are used, the offset value may identify the location within the dictionary corresponding to the scanning order of the current pixels (e.g., the scanning order of the current block).

At 1050, a length range code is decoded. The length range code indicates a number of bits for a length value code. For example, possible length values can be divided into a number of ranges (e.g., as depicted in Table 2 above), with the length range code indicating the range and the number of bits used for the length value code.

At 1060, the length value code is decoded (using the number of bits indicated at 1050) to produce the length value. The length value specifies the number of pixels being predicted.

At 1070, the current pixel values are predicted from pixel values in at least one dictionary using the offset value and the length value. The current pixel values can be predicted from corresponding pixel values in a 1-D dictionary storing previous pixel values in a scan order corresponding to the current pixel values (e.g., horizontal or vertical scanning order). The location in the 1-D dictionary is identified by the offset value with the number of current pixel vales being predicted indicated by the length value. The current pixel values can be predicted exactly using the same pixel values (e.g., YUV or RGB component values) as the previous pixel values in the dictionary without any residual or other modification.

The current pixel values, after being predicted, can be used for reconstructing a two-dimensional video picture or image (e.g., using a horizontal or vertical scanning order for a current block).

XI. Innovations for Encoding in the 1-D and Pseudo 2-D Dictionary Modes

This section presents various innovations for encoding that can be applied to the 1-D, pseudo 2-D, and/or inter pseudo 2-D dictionary modes. Some innovations relate to finding matching pixel values within the dictionary and/or previously reconstructed pixel values, while others related to the cost of signaling in matching mode and early termination.

A. Hash Based Matching in 1-D Dictionary Mode

In some implementations, a video or image encoder uses a hash-based search technique to identify matching pixel values. In a specific implementation of the hash-based search technique, hash values are calculated and stored for every 1 pixel (e.g., every combined pixel that treats the components of the pixel, such as Y, U, and V components, or R, G, and B components, together), every 2 pixels, every 4 pixels, and every 8 pixels. For example, hash values can be created when a pixel value is added to a dictionary (e.g., added to a 1-D dictionary) for each combination of 1, 2, 4, and 8 pixels of which the current pixel is a part. As an example, a first pixel value can be encoded and added to a 1-D dictionary. A hash value for the first pixel value can be determined and added (e.g., to a hash table). A second pixel value can be encoded and added to the 1-D dictionary. A hash value for the second pixel value can be determined and added. In addition, a hash value for the 2-pixel combination (the first pixel value and the second pixel value) can be calculated and added, and so on as additional pixel values are added to the 1-D dictionary.

Matching is then performed to see if a pixel value (or pixel values) in the hash matches the current pixel value (or current pixel values) being encoded. First, a check is made to match every 1 pixel value using the hashed pixel values (e.g., by creating a hash of 1 current pixel value and comparing it to hashes of previous 1 pixel values in a dictionary). If a 1 pixel match is found, an encoder can check how many pixels can match from the current pixel to determine the length (the number of pixels that match from the current pixel). If a matching length of 2 is found (e.g., if a current pixel value matches a pixel value in the dictionary at a specific offset with length 2), then matching can proceed with 2 pixels and above (e.g., pixel values at other offsets in the dictionary with a length of 2, or more, may match the current pixel) without the need to check hashes of 1 pixel anymore for the current pixel. Similarly, if a matching length of 4 is found, then hash checking begins with 4 pixels and above, and similarly with 8 pixels. In some implementations, hash search is implemented with 1, 2, 4, and 8 pixels. In other implementations, hash search can use greater or fewer pixels.

As an example, consider a dictionary that ends with the following eight pixel values (with the value and location indicated, e.g., p−3 is the pixel three pixels back in the dictionary with a pixel value of 3):

[ . . . 4(p−8), 3(p−7), 4(p−6), 7(p−5), 1(p−4), 3(p−3), 4(p−2), 5(p−1)]

The current pixels are going to be encoded by the encoder:

3(p0), 4(p1), 7(p2), 1(p3), 6(p4), 2(p5)

Encoding begins in the hash encoding mode by checking the hash value for 1 pixel p0. The hash value for p0 matches the 1 pixel hash value of p−3 (and both p0 and p−3 have a pixel value of 3). The hash matching only determines the start position of the checking. From the start position, the encoder also needs to check the actual number of matching pixel values. Therefore, the encoder checks for the length of matching pixel values. In this example, the encoder checks whether p0==p−3 (both p0 and p−3 have a pixel value of 3, so yes), then checks whether p1==p−2 (both have a pixel value of 4, so yes), then checks whether p2==p−1 (the pixel values do not match, 7!=5, so the encoder stops and determines that the matching length is 2). Next, the encoder starts to check from hash values for two pixels (because a match with a length of 2 has already been found, the encoder does not check for hash matches of 1 pixel anymore). The hash value for p0p1 matches the 2 pixel has value of p−7p−6. Then, the encoder checks for the length of matching pixel values. In this example, the encoder checks whether p0p1==p−7p−6 (both have pixel values of 3, 4, so yes), then checks whether p2==p−5 (both have a pixel value of 7, so yes), then checks whether p3==p−4 (both have a pixel value of 1, so yes), then checks whether p4==p−3 (the pixel values do not match, 6!=3, so the encoder stops and determines that the matching length is 4). The encoder can then proceed to check hash matches of 4 pixels to see if a longer matching length can be found (and eventually with hash matches of 8 pixels). When the encoder is done checking, the current pixel values will be encoded with the largest matching length found.

Even if a pixel value (or multiple pixel values) in a dictionary (e.g., a 1-D dictionary) have the same hash value as a current pixel value, matching is still performed to see if the pixel values in the dictionary can be used for prediction. For example, the hash value for a pixel in a 1-D dictionary may be the same as the hash value for a current pixel. The pixel value in the 1-D dictionary still needs to be compared to determine if the pixel value of the current pixel is the same (i.e., different pixel values can have the same hash value).

In some implementations, even if a match is found for one or more current pixels, the cost of encoding the one or more current pixels (e.g., in terms of number of bits) in matching mode using an offset and length can be greater than the cost of encoding the one or more current pixels directly (e.g., in terms of number of bits). In this situation, the one or more current pixels can be coded directly (e.g., the encoder can switch from matching mode to direct mode for the one or more current pixels, which can be identified in the bit stream by an escape code or flag). The encoder can switch between matching mode and direct mode when needed (e.g., on a pixel by pixel basis, on a block by block basis, or on some other basis).

In some implementations, early termination is performed by the encoder. For example, if enough pixel values have been processed (e.g., N pixel values), and the average matching length (for direct mode, the matching length can be considered as 1) is smaller than a threshold (e.g., a threshold value of T), dictionary mode estimation can be terminated early (e.g., on a block by block basis). For example, dictionary mode can be terminated and the picture can be re-encoded using other encoding modes, or dictionary mode can be terminated for the remainder of the picture or a portion of the picture (e.g., the current block). Early termination can be performed when the average matching length is small enough that dictionary mode would be less efficient than other encoding modes (e.g., less efficient than normal intra mode, normal inter mode, etc.). For example, the average matching length threshold T can be 2 or 3 in some implementations.

B. Hash Based Matching in Pseudo 2-D Dictionary Mode

Hash based matching during encoding can be performed in the pseudo 2-D dictionary mode (and in the inter pseudo 2-D dictionary mode) similar to the hash based matching described above for the 1-D dictionary mode.

Similar to the 1-D dictionary mode, hash values are created for previous pixel values in groupings of 1, 2, 4, and 8 pixel values. However, when matching, the pseudo 2-D dictionary mode (and inter pseudo 2-D dictionary mode) starts checking with 8 pixel hash values (instead of starting with 1 pixel hash matches). If a match of length 8 is found, then the maximum length should be no less than 8 and there is no need to check hash values for 4 pixels or less. However, if a match of length 8 is not found, then checking starts for matches of 4 pixels, and so on down to 1 pixel. If an 8 pixels match is not found by hash matching, and the current matching length is 7 (e.g., hash matching for 4 pixels is found and from that start position, an encoder found actually there are 7 matching pixels), an encoder can terminate here as there is no match for 8 pixels.

C. Example Methods for Encoding Pixel Values Using a Dictionary Mode

Methods can be provided for encoding pixel values using the 1-D dictionary mode, pseudo 2-D dictionary mode, and/or inter pseudo 2-D dictionary mode. Encoding can comprise computing hash values of previous pixel values (e.g., reconstructed pixel values) and comparing the hash values to hash values of current pixel values to be encoded. Matches can be identified by offset and length (e.g., in a 1-D dictionary or a previously encoded values in a picture) and encoded. Encoding can be performed in direct mode if no match is found.

Figure 11:
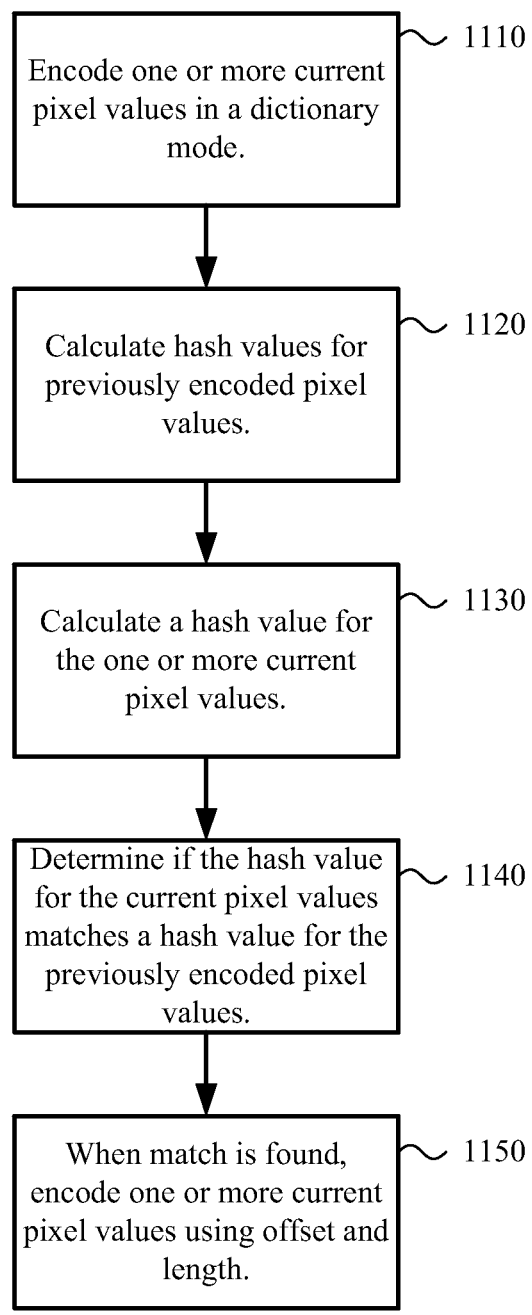
FIG. 11 is a flowchart of an example method for encoding pixel values using a dictionary mode.

FIG. 11 is a flowchart of an example method 1100 for encoding pixel values using a dictionary mode. At 1110, one or more current pixel values are encoded in a dictionary mode (e.g., 1-D dictionary mode, pseudo 2-D dictionary mode, or inter pseudo 2-D dictionary mode). Encoding the current pixel values comprises performing operations according to 1120 through 1150.

At 1120, hash values are calculated for previously encoded pixel values (e.g., reconstructed pixel values). For example, hash values can be calculated for combinations of 1 pixel, 2 pixels, 4 pixels, and 8 pixels.

At 1130, a hash value is calculated for the one or more current pixel values to be encoded.

At 1140, the hash value for the one or more current pixel values is compared to the hash values of the previously encoded pixel values to determine if a match is found. Once a match is found (e.g., for 1 pixel value), then the length of pixels that match can be determined.

At 1150, when a match is found, the one or more current pixel values are encoded using an offset and length. For example, the offset and length can indicate a location in a 1-D dictionary where the current pixel values are predicted or a location within a previously reconstructed picture (e.g., using X and Y offset values for a pseudo 2-D dictionary mode or an inter pseudo 2-D dictionary mode).

We claim:

1. A computing device comprising a processing unit and memory implementing a video decoder or image decoder configured to perform operations comprising:

receiving encoded data for a picture in a bit stream; and decoding one or more current pixel values from the encoded data, comprising:

decoding an offset from the encoded data indicating an offset location within a one-dimensional dictionary of previously decoded pixel values, wherein the one-dimensional dictionary is a horizontal scanning one-dimensional dictionary, and wherein decoding the offset comprises:

decoding an offset range code indicating a range of offset values and a number of bits to decode for an offset value; and based on the offset range code, decoding the offset value from the indicated number of bits for the offset value, wherein the offset location within the one-dimensional dictionary is identified by the offset value;

decoding a length from the encoded data, wherein decoding the length comprises:

decoding a length range code indicating a range of length values and a number of bits to decode for a length value; and based on the length range code, decoding the length value from the indicated number of bits for the length value;

predicting the one or more current pixel values from one or more corresponding pixel values in the previously decoded pixel values at the offset location, wherein a number of pixels being predicted is indicated by the length value;

adding the decoded one or more current pixel values to the horizontal scanning one-dimensional dictionary in horizontal scanning order; and adding the decoded one or more current pixel values to a vertical scanning one-dimensional dictionary in vertical scanning order.

2. The computing device of claim 1 wherein the one or more current pixel values and the one or more corresponding pixel values are combined YUV pixel values.

3. The computing device of claim 1 wherein the one or more current pixel values are decoded according to a 1-D dictionary mode.

4. The computing device of claim 3 the operations further comprising:

determining a size of the one-dimensional dictionary; and when the size of the one-dimensional dictionary is greater than a pre-determined maximum, reducing the size of the one-dimensional dictionary.

5. The computing device of claim 1 wherein the one or more current pixel values are decoded in a matching mode that predicts the one or more current pixel values from the one or more corresponding pixel values in the previously decoded pixel values, the method further comprising:

decoding one or more other current pixel values from the encoded data, comprising:

decoding the one or more other current pixel values using a direct mode in which the one or more other current pixel values are encoded directly without prediction.

6. The computing device of claim 1 the operations further comprising:

reconstructing at least a portion of the picture in one of a horizontal scanning order and a vertical scanning order using, at least in part, the decoded one or more current pixel values.

7. The computing device of claim 1 wherein for one or more other current pixel values the offset indicates an X/Y offset location within a current picture of previously decoded pixel values, and wherein the one or more other current pixel values are decoded according to a pseudo 2-D dictionary mode.

8. The computing device of claim 7 wherein decoding the offset for the one or more other current pixel values comprises:
  decoding an X offset value from a first offset range code indicating a range of offset values and a number of bits to decode for the X offset value; and
  decoding a Y offset value from a second offset range code indicating a range of offset values and a number of bits to decode for the Y offset value;
  wherein the X/Y offset location within the previously decoded pixel values is identified by the X offset value and the Y offset value.

9. In a computing device with a video decoder or image decoder, a method comprising:
  receiving encoded data for a picture in a bit stream; and
  decoding a number of current pixel values from the encoded data using a 1-D dictionary mode, comprising:
    decoding an offset range code, wherein the offset range code indicates a number of bits for an offset value code;
    decoding the offset value code from the indicated number of bits to produce an offset value, wherein the offset value identifies a location in at least one dictionary of previously decoded pixel values, wherein the at least one dictionary comprises a horizontal scanning one-dimensional dictionary and a vertical scanning one-dimensional dictionary;
    decoding a length range code, wherein the length range code indicates a number of bits for a length value code;
    decoding the length value code from the indicated number of bits to produce a length value; and
    predicting the current pixel values from corresponding pixel values at the location, in the at least one dictionary, identified by the offset value with the number of current pixel values being predicted indicated by the length value;
    adding the decoded number of current pixel values to the horizontal scanning one-dimensional dictionary in horizontal scanning order; and
    adding the decoded number of current pixel values to the vertical scanning one-dimensional dictionary in vertical scanning order; and
  reconstructing at least a portion of the picture in one of a horizontal scanning order and a vertical scanning order using, at least in part, the decoded number of current pixel values.

10. In a computing device with a video encoder or image encoder, a method comprising:
  encoding data for a picture, including using a dictionary mode for encoding one or more current pixel values, the encoding comprising:
    calculating hash values for previously encoded pixel values;
    calculating a hash value for the one or more current pixel values to be encoded;
    determining if the hash value for the one or more current pixel values matches a hash value for the previously encoded pixel values;
    when a match is found, encoding the one or more current pixel values using an offset and length that predicts the one or more current pixel values from the matching previously encoded pixel values, comprising:
      encoding an offset range code, wherein the offset range code indicates a number of bits for an offset value code;
      encoding the offset value code from the indicated number of bits to produce an offset value, wherein the offset value identifies a location in at least one dictionary of previously encoded pixel values, wherein the at least one dictionary comprises a horizontal scanning one-dimensional dictionary and a vertical scanning one-dimensional dictionary;
      encoding a length range code, wherein the length range code indicates a number of bits for a length value code;
      encoding the length value code from the indicated number of bits to produce a length value; and
      encoding the one or more current pixel values using corresponding pixel values at the location, in the at least one dictionary, identified by the offset value with a number of current pixel values being encoded indicated by the length value;
      adding the encoded number of current pixel values to the horizontal scanning one-dimensional dictionary in horizontal scanning order; and
      adding the encoded number of current pixel values to the vertical scanning one-dimensional dictionary in vertical scanning order.

11. The method of claim 10 wherein the one or more current pixel values and the previously encoded pixel values are one of combined YUV pixel values, combined RGB pixel values, and combined GBR pixel values.

12. The method of claim 10 wherein calculating the hash values for the previously encoded pixel values comprises:
  calculating hash values for each 1 pixel value of the previously encoded pixel values;
  calculating hash values for each 2 pixel values of the previously encoded pixel values;
  calculating hash values for each 4 pixel values of the previously encoded pixel values; and
  calculating hash values for each 8 pixel value of the previously encoded pixel values.

13. The method of claim 10 further comprising:
  calculating an average match length;
  when the average match length is below a threshold value, switching to an encoding mode other than the dictionary mode for a current block.

* * * * *